United States Patent
Horiuchi

(10) Patent No.: US 12,235,658 B2
(45) Date of Patent: Feb. 25, 2025

(54) INFORMATION PROCESSING DEVICE, INFORMATION PROCESSING SYSTEM, METHOD, AND PROGRAM

(71) Applicant: Sony Group Corporation, Tokyo (JP)

(72) Inventor: Kie Horiuchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 227 days.

(21) Appl. No.: 17/921,143

(22) PCT Filed: May 19, 2021

(86) PCT No.: PCT/JP2021/018916
§ 371 (c)(1),
(2) Date: Oct. 25, 2022

(87) PCT Pub. No.: WO2021/246170
PCT Pub. Date: Dec. 9, 2021

(65) Prior Publication Data
US 2023/0185317 A1      Jun. 15, 2023

(30) Foreign Application Priority Data
Jun. 3, 2020   (JP) .................. 2020-096781

(51) Int. Cl.
*G05D 1/12*      (2006.01)
*G05D 1/00*      (2006.01)

(52) U.S. Cl.
CPC ............. *G05D 1/12* (2013.01); *G05D 1/0212* (2013.01)

(58) Field of Classification Search
CPC ....... G05D 1/12; G05D 1/0212; G05D 1/0246
See application file for complete search history.

(56) References Cited

U.S. PATENT DOCUMENTS

| 2004/0073368 A1* | 4/2004 | Gonzalez-Banos ........................ G05D 1/0274 701/301 |
| 2008/0079383 A1* | 4/2008 | Nakamoto ........... G05D 1/0255 318/587 |

(Continued)

FOREIGN PATENT DOCUMENTS

| JP | 2007-199965 A | 8/2007 |
| JP | 2009-20749 A  | 1/2009 |

(Continued)

OTHER PUBLICATIONS

International Search Report and Written Opinion mailed on Jul. 20, 2021, received for PCT Application PCT/JP2021/018916, filed on May 19, 2021, 10 pages including English Translation.

*Primary Examiner* — Adam R Mott
*Assistant Examiner* — Sagar Kc
(74) *Attorney, Agent, or Firm* — XSENSUS LLP

(57) ABSTRACT

A device and a method that prevent a tracking target tracked by a mobile device from deviating from a field of view at a fork, thereby enabling reliable tracking, are provided. When a control parameter determination unit of a mobile device cannot discriminate one of a plurality of routes constituting a fork that a tracking target selects and moves along, the control parameter determination unit calculates a goal position for bringing the tracking target within a viewing angle of the mobile device and a goal posture at the goal position, and generates a control parameter including the calculated goal position and goal posture. The control parameter determination unit calculates a position and posture that enable the tracking target to be within the viewing angle of the mobile device regardless of a route that the tracking target selects and moves along.

17 Claims, 24 Drawing Sheets

(56) References Cited

U.S. PATENT DOCUMENTS

| | | | |
|---|---|---|---|
| 2012/0185094 A1* | 7/2012 | Rosenstein | B25J 5/007 |
| | | | 901/1 |
| 2016/0188977 A1* | 6/2016 | Kearns | B25J 11/002 |
| | | | 348/113 |
| 2018/0181137 A1* | 6/2018 | Choi | G06V 20/10 |

FOREIGN PATENT DOCUMENTS

| | | |
|---|---|---|
| JP | 2010-15194 A | 1/2010 |
| JP | 2014-92862 A | 5/2014 |
| JP | 2019-204414 A | 11/2019 |
| WO | 2019/069626 A1 | 4/2019 |

* cited by examiner

INFORMATION PROCESSING DEVICE, INFORMATION PROCESSING SYSTEM, METHOD, AND PROGRAM

CROSS-REFERENCE TO RELATED APPLICATIONS

The present application is based on PCT filing PCT/JP2021/018916, filed May 19, 2021, which claims priority to JP 2020-096781, filed Jun. 3, 2020, the entire contents of each of which are incorporated herein by reference.

TECHNICAL FIELD

The present disclosure relates to an information processing device, an information processing system, a method, and a program. More specifically, the present invention relates to an information processing device, an information processing system, a method, and a program for generating a movement route when a mobile device such as a robot tracks a person, a vehicle, or the like.

BACKGROUND ART

In recent years, the use of automated mobile objects such as robots, automated driving vehicles, and drones has increased.

Examples of such automated mobile objects include an automated mobile object configured to set another mobile object, a person, or the like in front of the automated mobile object as a "tracking target" and move while tracking the tracking target.

Normally, when a mobile device such as a robot tracks a tracking target, the mobile device performs processing for bringing the tracking target within a field of view of, for example, a camera of the robot, confirming the tracking target, setting a movement goal position at a position of the tracking target or immediately in front of the position, generating a movement route to the set goal position, and moving.

However, when there is a fork branched into a plurality of routes in a traveling direction of the tracking target and the tracking target suddenly moves to a side road from the fork, the tracking target is out of the field of view of the robot, the robot cannot recognize the tracking target, and tracking processing is not possible.

When the tracking target is out of a viewing angle, it is common to estimate a position of the tracking target and try to track the tracking target on the basis of a result of the estimation. However, in many cases, there is a problem that it takes a long time to recognize the tracking target, and position estimation from a discrete movement trajectory obtained by calculation easily deviates. In particular, it is easy for misestimation to occur when the tracking target does not track a smooth trajectory.

Another method is a scheme for performing movement to a position at which a goal falls within a field of view, assuming that a tracking goal exists at a past observation position without performing estimation processing.

However, it is difficult to apply this scheme, for example, when the tracking target is out of the field of view at a fork and a route which the tracking target has selected at the fork is not clear.

Examples of related art describing a robot that moves while tracking a specific target include PTL 1 (JP 2009-020749 A) and PTL 2 (JP 2010-015194 A).

PTL 1 (JP 2009-020749 A) discloses a configuration in which a robot estimates a position of a tracking target and tracks the tracking target when the robot loses sight of the tracking target.

When a sensor cannot detect the tracking target, a position on a map at which the tracking target exists is estimated on the basis of a movement history and a transition probability.

However, the configuration using the transition probability described in PTL 1 has a problem that when estimation is incorrect, a target position deviates greatly from a field of view, making recovery and use at a fork difficult.

PTL 2 (JP 2010-015194 A) discloses a configuration that secures a field of view of a robot when the field of view of the robot is about to be blocked by an obstacle or the like. PTL 2 discloses a configuration in which the robot detects a movable area and moves when a pedestrian or the like intervenes and a tracking target becomes invisible or when it becomes impossible to generate a movement route.

However, in the configuration described in PTL 2, there are problems that a fork itself is not recognized as an obstacle, and an optimum position for capturing the tracking target within a field of view of the robot cannot be analyzed because it is not possible to determine one of routes of the fork which the tracking target selects and moves along.

CITATION LIST

Patent Literature

PTL 1

JP 2009-020749 A

PTL 2

JP 2010-015194 A

SUMMARY

Technical Problem

The present disclosure has been made, for example, in view of the above problem, and an object of the present disclosure is to provide an information processing device, an information processing system, a method, and a program for achieving more reliable tracking processing by reducing a probability of losing sight of a tracking target when a movement direction of the tracking target at a fork cannot be estimated.

Solution to Problem

A first aspect of the present disclosure is an information processing device including:
  a control parameter determination unit configured to determine control parameters used for a mobile device to track a tracking target,
  wherein the control parameter determination unit calculates a goal position for bringing the tracking target within a viewing angle of the mobile device and a goal posture at the goal position, and generates a control parameter including the calculated goal position and goal posture when one of a plurality of routes constituting a fork which the tracking target selects and moves along cannot be discriminated.

Further, a second aspect of the present disclosure is an information processing system including a mobile device, and an information processing device capable of communicating with the mobile device, wherein the information processing device includes a control parameter determination unit configured to determine control parameters used for a mobile device to track a tracking target, the control parameter determination unit calculates a goal position for bringing the tracking target within a viewing angle of the mobile device and a goal posture at the goal position, and generates a control parameter including the calculated goal position and goal posture when one of a plurality of routes constituting a fork which the tracking target selects and moves along cannot be discriminated, and the mobile device moves according to control parameters including the goal position and the goal posture generated by the information processing device.

Further, a third aspect of the present disclosure is an information processing method executed in an information processing device, wherein the information processing device includes a control parameter determination unit configured to determine control parameters used for a mobile device to track a tracking target, and the control parameter determination unit calculates a goal position for bringing the tracking target within a viewing angle of the mobile device and a goal posture at the goal position, and generates a control parameter including the calculated goal position and goal posture when one of a plurality of routes constituting a fork which the tracking target selects and moves along cannot be discriminated.

Further, a fourth aspect of the present disclosure is an information processing method executed in an information processing system including a mobile device, and an information processing device capable of communicating with the mobile device, wherein the information processing device includes a control parameter determination unit configured to determine control parameters used for a mobile device to track a tracking target, the control parameter determination unit calculates a goal position for bringing the tracking target within a viewing angle of the mobile device and a goal posture at the goal position, and generates a control parameter including the calculated goal position and goal posture when one of a plurality of routes constituting a fork which the tracking target selects and moves along cannot be discriminated, and the mobile device moves according to control parameters including the goal position and the goal posture generated by the information processing device.

Further, a fifth aspect of the present disclosure is a program for causing information processing to be executed in an information processing device, wherein the information processing device includes a control parameter determination unit configured to determine control parameters used for a mobile device to track a tracking target, and the program causes the control parameter determination unit to calculate a goal position for bringing the tracking target within a viewing angle of the mobile device and a goal posture at the goal position, and generate a control parameter including the calculated goal position and goal posture when one of a plurality of routes constituting a fork which the tracking target selects and moves along cannot be discriminated.

The program of the present disclosure is, for example, a program that can be provided by a storage medium provided in a computer-readable form to an information processing device or a computer system that can execute various program codes, or a communication medium. By providing such a program in a computer-readable form, processing according to the program can be realized on the information processing device or the computer system.

Still other objects, characteristics, and advantages of the present disclosure will become apparent by more detailed description based on the embodiments of the present disclosure or the accompanying drawings described below. Further, in the present specification, the system is a logical collective configuration of a plurality of devices, and the devices of the respective configuration are not limited to being in the same case.

According to the configuration of the embodiment of the present disclosure, the device and the method that prevent the tracking target tracked by the mobile device from deviating from the field of view at the fork, thereby enabling reliable tracking, are realized.

Specifically, for example, when the control parameter determination unit of the mobile device cannot discriminate one of a plurality of routes constituting a fork that the tracking target selects and moves along, the control parameter determination unit calculates a goal position for bringing the tracking target within the viewing angle of the mobile device, and a goal posture at the goal position, and generates a control parameter including the calculated goal position and goal posture. The control parameter determination unit calculates a position and posture that enable the tracking target to be within the viewing angle of the mobile device regardless of a route that the tracking target selects and moves along.

With this configuration, the device and the method that prevent the tracking target tracked by the mobile device from deviating from the field of view at the fork, thereby enabling reliable tracking, are realized.

The effects described in the present specification are merely exemplary and not limited, and there may be additional effects.

DESCRIPTION OF EMBODIMENTS

Hereinafter, details of the information processing device, information processing system, method, and program of the present disclosure will be described with reference to the drawings. The description will be made according to the following items.

1. Overview of Movement Processing of Robot of Present Disclosure
2. Configuration Example of Mobile Device (Robot)
3. Overall Sequence of Mobile Device (Robot) Control
4. Details of Processing Executed by Tracking Target and Fork Correspondence Robot Control Parameter Determination Unit
5. Example of Generation of Control Parameters (Goal Position, Goal Posture, and Goal Route) for Robots with Different Viewing Angles
6. Example of Processing According to Various Fork Configurations or Robot Viewing Angles
7. Configuration Examples of Mobile Device and Information Processing Device of Present Disclosure
8. Conclusion of Configuration of Present Disclosure 1. Overview of Movement Processing of Robot of Present Disclosure First, an overview of movement processing of a robot of the present disclosure will be described.

As described above, when the mobile device such as a robot tracks the tracking target, the mobile device performs processing for bringing the tracking target within a field of view of, for example, a camera of the robot, confirming the tracking target, setting a movement goal position at a position of the tracking target or immediately in front of the position, generating a movement route to the set goal position, and moving.

However, when there is a fork branched into a plurality of routes in a traveling direction of the tracking target and the tracking target suddenly moves to a side road from the fork, the tracking target is out of the field of view of the robot, the robot cannot recognize the tracking target, and tracking processing is not possible.

The present disclosure solves such a problem and realizes reliable tracking processing without losing sight of the tracking target.

An overview of the movement processing of the robot of the present disclosure will be described with reference to FIG. 1.

Figure 1:
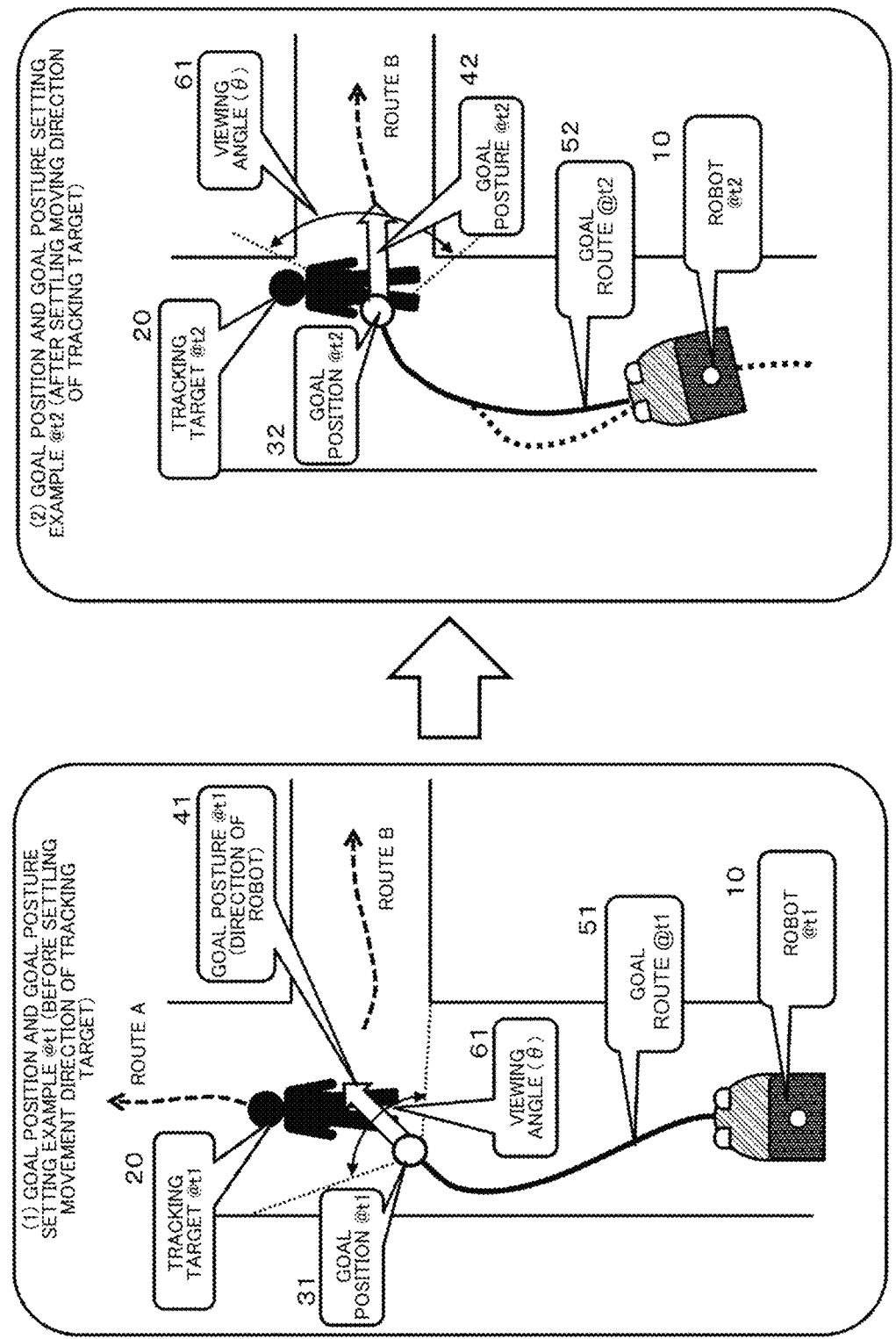
FIG. 1 is a diagram illustrating an overview of movement processing of a robot of the present disclosure.

FIG. 1 illustrates an example of a case in which a robot 10 moves while tracking a tracking target 20, and illustrates the following diagrams corresponding to two different times (t1 and t2).

(1) Goal position and goal posture setting example @t1 (before settling a movement direction of the tracking target)

(2) Goal position/goal posture setting example @t2 (after settling movement direction of the tracking target)

"(1) Goal position and goal posture setting example @t1 (before settling the movement direction of the tracking target)" shows a goal position 31, a goal posture 41, and a goal route 51 set by the robot 10 at a time (t1).

In this time t1, the robot 10 cannot estimate or determine which of two routes forming a fork, route A and route B, along which the tracking target 20 will travel.

In this state, the robot 10 sets a goal position 31, a goal posture 41, and a goal route 51 as illustrated in FIG. 1(1).

The goal posture 41 at the goal position 31 is a direction of the robot 10 at the goal position 31. The robot 10 can observe and analyze an object within a range of the viewing angle (θ) 61 illustrated in the figure by setting a direction of the robot in an arrow direction illustrated in the figure. That is, the viewing angle (θ) 61 corresponds to an object recognition range of a sensor such as a camera included in the robot 10.

As illustrated in FIG. 1, when the goal posture 41 is set at the goal position 31, a range from fork A to fork B can be set within the viewing angle. That is, when the robot 10 is set in the goal posture 41 at the goal position 31, it is possible to bring the tracking target 20 within the field of view regardless of one of the two routes including route A or route B along which the tracking target 20 travels, and it is possible to continue the tracking processing without losing sight of the tracking target 20.

The present disclosure makes it possible to calculate an optimal position (=the goal position 31), an optimal posture (the goal posture 41), and the goal route 51 for tracking the tracking target 20 without losing sight in a state in which it is impossible to estimate and determine which of a plurality of routes forming a fork along which the tracking target 20 will travel.

Processing for generating the goal route 51 is a route for setting the goal posture 41 at the goal position 31, and various existing algorithms can be applied as a route generation algorithm.

For example, a current position and posture of the robot 10, the goal position 31, and the goal posture 41 are considered to calculate a smooth route. Specifically, route generation in which a scheme such as "Hybrid A Star (Hybrid A*)" or Dynamic Window Approach (DWA) that is an existing route generation algorithm, or machine learning data has been applied is possible.

FIG. 1(2) illustrates a state at time t2 after time t1, including a goal position 32, a goal posture 42, and a goal route 52 set by the robot 10 at time (t2).

The state at time t2 is a state after a determination is made that the tracking target 20 travels along route B between the two routes A and B that form the fork.

Analysis of a selected route of the tracking target 20 is performed, for example, by analyzing a direction or traveling direction of the tracking target from a camera-captured image of the robot 10.

After a determination is made that the tracking target 20 travels along route B, the goal position 32, the goal posture 42 and the goal route 52 are changed from the goal position 31, the goal posture 41 and the goal route 51 shown in FIG. 1(1), respectively, and updated, as illustrated in FIG. 1(2). In this case, a range of viewing angle (θ) includes only route B that is a selected route of the tracking target 20.

The robot 10 of the present disclosure makes it possible to calculate an optimal position (=the goal position 31) or an optimal posture (the goal posture 41) for tracking the tracking target 20 without losing sight in the state shown in FIG. 1(1), that is, a state in which it is impossible to estimate and determine which of a plurality of routes forming a fork along which the tracking target 20 will travel.

In the following embodiment, an automated traveling robot will be described as an example of a mobile device that tracks the tracking target 20, but the mobile device of the present disclosure may be not only such an automated traveling robot but also any of various mobile devices such as an automated driving vehicle or a drone.

The present disclosure discloses processing for dealing with a case in which it is difficult to estimate the traveling direction of the tracking target at a fork. In the case of a drone, in settings for tracking a person who moves through an indoor passage such as a building, it may be difficult to determine a passage through which a person who is a tracking target will travel at a fork in the passage in the building, for example. The processing of the present disclosure can be used for drone flight route control in such a case.

Hereinafter, an example of processing in a case in which an automated mobile robot that travels on the same plane as the tracking target is applied will be described as a representative example.

In order for the robot 10 illustrated in FIG. 1 to track the tracking target 20, it is necessary to generate each of these pieces of information, as described above:

(a) goal position,
(b) posture at the goal position (direction of the robot), and
(c) goal route (=movement route for setting up the goal posture at the goal position).

The data processing unit of the information processing device included inside the robot 10 may perform generation of each piece of information or control of the movement of the robot, or an external information processing device capable of communicating with the robot may perform the generation of each piece of information or control of the movement of the robot.

Although an example in which the data processing unit of the information processing device inside the robot 10 generates the above information and performs the control of the movement of the robot will be described in the following embodiment, a configuration in which an information processing device that can communicate with the robot 10 executes the processing that is executed by the robot 10 in the following description is also possible.

2. Configuration Example of Mobile Device (Robot)

Next, a configuration example of the mobile device (robot) will be described.

Figure 2:
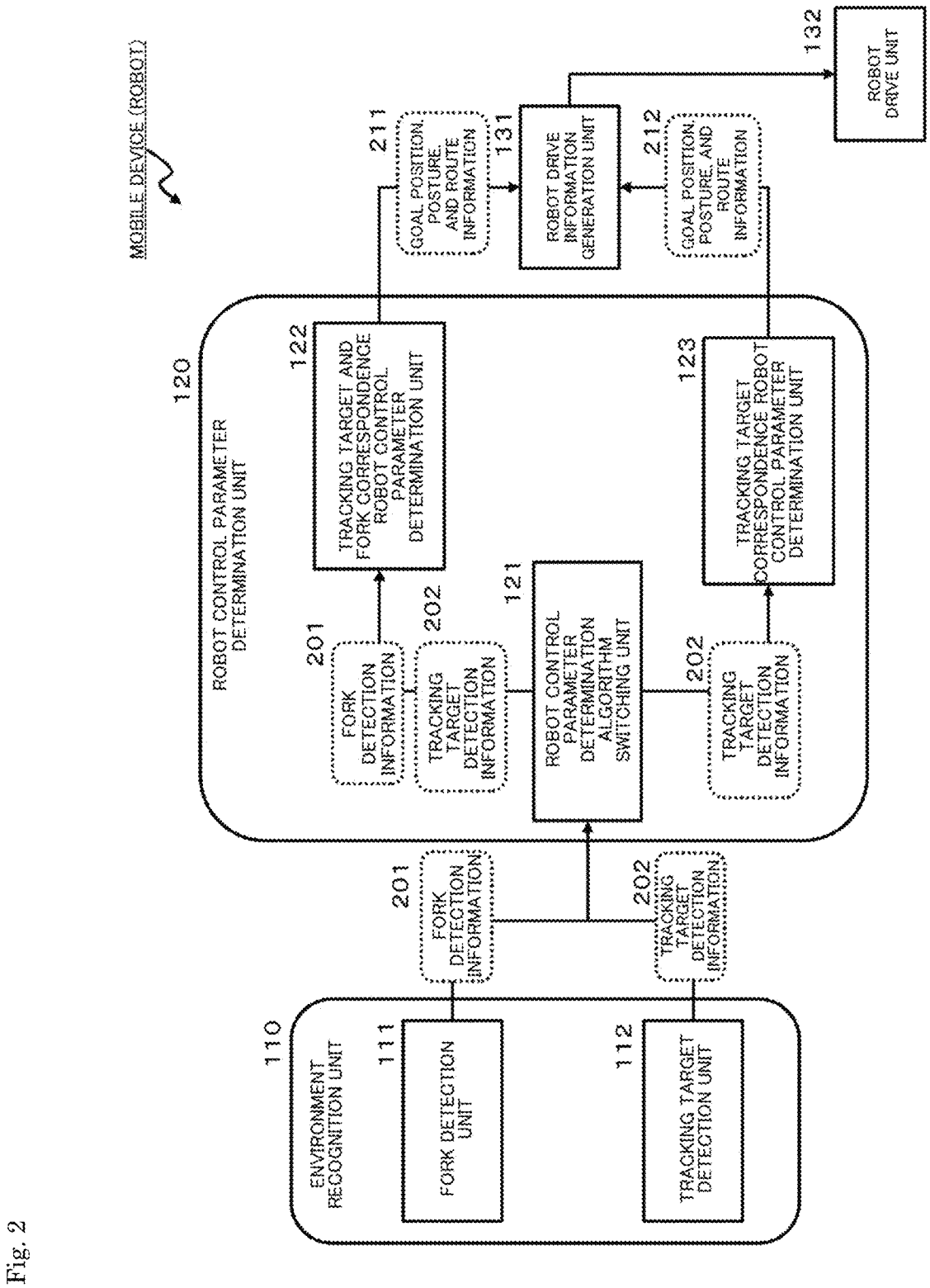
FIG. 2 is a block diagram illustrating a configuration example of a main configuration of a mobile device (robot) of the present disclosure.

FIG. 2 is a block diagram illustrating a configuration example of a main configuration of the mobile device (robot) 100 of the present disclosure.

The mobile device (robot) 100 illustrated in FIG. 2 is a block diagram illustrating a main configuration of the robot 10 illustrated in FIG. 1.

As illustrated in FIG. 2, the mobile device (robot) 100 includes an environment recognition unit 110, a robot control parameter determination unit 120, a robot drive information generation unit 131, and a robot drive unit 132.

The environment recognition unit 110 includes a fork detection unit 111 and a tracking target detection unit 112.

The robot control parameter determination unit 120 includes a robot control parameter determination algorithm switching unit 121, a tracking target and fork correspondence robot control parameter determination unit 122, and a tracking target correspondence robot control parameter determination unit 123.

The environment recognition unit 110 analyzes map data stored in a storage unit (not illustrated) or information acquired from a camera and a distance sensor (not illustrated) to analyze an environment around a route of the mobile device (robot) 100.

The mobile device (robot) 100 includes a camera that captures an image in a traveling direction or an image of a tracking target, or various sensors such as an object detection sensor configured of, for example, light detection and ranging or laser imaging detection and ranging (LiDAR), a stereo camera, a ToF sensor, an ultrasonic sensor, a radar, and a sonar.

The environment recognition unit 110 analyzes the environment around the route of the mobile device (robot) 100 by referring to detection information from these cameras and sensors or the map data stored in the storage unit.

The fork detection unit 111 detects a fork in a movement direction of the mobile device 100, that is, a junction of a plurality of routes, using a map or detected data from a camera or a sensor, and analyzes a configuration of the fork, a distance to the fork, or the like. The analysis of the fork is, for example, a route setting configuration of the fork.

The fork detection information 201 including configuration information of the fork detected by the fork detection unit 111, distance information to the fork, or the like are output to the robot control parameter determination algorithm switching unit 121 of the robot control parameter determination unit 120.

The tracking target detection unit 112 analyzes the position, posture, distance, or the like of the tracking target using detection data of the camera or sensor.

An angle at which the mobile device (robot) 100 can recognize the tracking target is called a viewing angle.

Tracking target detection information 202 including the position, posture, distance, or the like of the tracking target detected by the tracking target detection unit 112 is output to the robot control parameter determination algorithm switching unit 121 of the robot control parameter determination unit 120.

The robot control parameter determination algorithm switching unit 121 of the robot control parameter determination unit 120 executes processing for switching between robot control parameter determination algorithms to be applied, on the basis of input information from the environment recognition unit 110.

The robot control parameter determination unit 120 includes the following two robot control parameter determination units:

(1) the tracking target and fork correspondence robot control parameter determination unit 122, and (2) the tracking target correspondence robot control parameter determination unit 123.

The two robot control parameter determination units execute processing for determining the robot control parameters using different algorithms.

The robot control parameters to be determined are the following parameters:

(a) goal position, (b) posture at the goal position (direction of the robot), and (c) goal route (=movement route for setting in the goal posture at the goal position).

The "(1) tracking target and fork correspondence robot control parameter determination unit 122" determines the robot control parameters (goal position, goal posture, and goal route) using not only the tracking target detection information 202 including the position, posture, distance, and the like of the tracking target detected by the tracking target detection unit 112, but also the fork detection information 201 including the configuration information of the fork detected by the fork detection unit 111, the distance information to the fork, or the like.

On the other hand, the "(2) tracking target correspondence robot control parameter determination unit 123" determines robot control parameters (goal position, goal posture, and goal route) using only the tracking target detection information 202 including the position, posture, distance, and the like of the tracking target detected by the tracking target detection unit 112.

When the fork is detected by the fork detection unit 111 and a determination is made that specifying the movement direction such as one of the plurality of routes of the fork that the tracking target selects and moves along cannot be performed on the basis of the tracking target detection information 202 input from the tracking target detection unit 112, the robot control parameter determination algorithm switching unit 121 causes the "(1) tracking target and fork correspondence robot control parameter determination unit 122" to determine the robot control parameters.

In other cases, the robot control parameters are determined in the "(2) tracking target correspondence robot control parameter determination unit 123".

The other cases are any of the following cases:

(a) when no fork is detected by the fork detection unit 111, or (b) when the fork is detected by the fork detection unit 111, but specifying the movement direction such as one of the plurality of routes of the fork that the tracking target selects and moves along can be performed on the basis of the tracking target detection information 202 input from the tracking target detection unit 112.

The robot control parameter determination algorithm switching unit 121 transmits the following information input from the environment recognition unit 110 to the "tracking target and fork correspondence robot control parameter determination unit 122" when the fork is detected by the fork detection unit 111 and a determination is made that specifying the movement direction such as one of the plurality of routes of the fork that the tracking target selects and moves along cannot be performed on the basis of the tracking target detection information 202 input from the tracking target detection unit 112.

(p) the fork detection information 201 including the configuration information of the fork detected by the fork detection unit 111, the distance information to the fork, and the like, and (q) the tracking target detection information 202 including the position, posture, distance, or the like of the tracking target detected by the tracking target detection unit 112.

The tracking target and fork correspondence robot control parameter determination unit 122 determines the robot control parameters, that is, the goal position, goal posture, and goal route, using the input information (p) and (q). An algorithm for determining the robot control parameters (goal position, goal posture, and goal route) will be described in detail below.

On the other hand, (a) when no fork is detected by the fork detection unit 111, or (b) when the fork is detected by the fork detection unit 111, but specifying the movement direction such as one of the plurality of routes of the fork which the tracking target selects and moves along can be performed on the basis of the tracking target detection information 202 input from the tracking target detection unit 112, the robot control parameter determination algorithm switching unit 121 transfers the following information input from the environment recognition unit 110 to the "tracking target control parameter determination unit 123":

(q) the tracking target detection information 202 including the position, posture, distance, or the like of the tracking target detected by the tracking target detection unit 112.

The tracking target correspondence robot control parameter determination unit 123 determines the robot control parameters, that is, the goal position, goal posture, and goal route using the input information (q).

For this algorithm for determining the robot control parameters (goal position, goal posture, and goal route), an existing algorithm according to a general tracking-target tracking algorithm can be applied.

Robot control parameters (goal position, goal posture, and goal route) 211 and 212 determined by either the tracking target and fork correspondence robot control parameter determination unit 122 or the tracking target correspondence robot control parameter determination unit 123 is input to the robot drive information generation unit 131.

The robot drive information generation unit 131 generates drive information for moving the mobile device (robot) 100 along the input goal route and setting the goal posture at the goal position, on the basis of the robot control parameters (goal position, goal posture, and goal route) 211 and 212 input from the tracking target and fork correspondence robot control parameter determination unit 122 or the tracking target correspondence robot control parameter determination unit 123.

The robot drive information generation unit 131 outputs the generated drive information to the robot drive unit 132.

The robot drive unit 132 drives the mobile device (robot) 100 according to the drive information input from the robot drive information generation unit 131. As a result, the mobile device (robot) 100 reaches the goal position via the goal route, and is set in the goal posture at the goal position.

3. Overall Sequence of Mobile Device (Robot) Control

Next, an overall control sequence of the mobile device (robot) 100 will be described with reference to the flowchart illustrated in FIG. 3.

Figure 3:
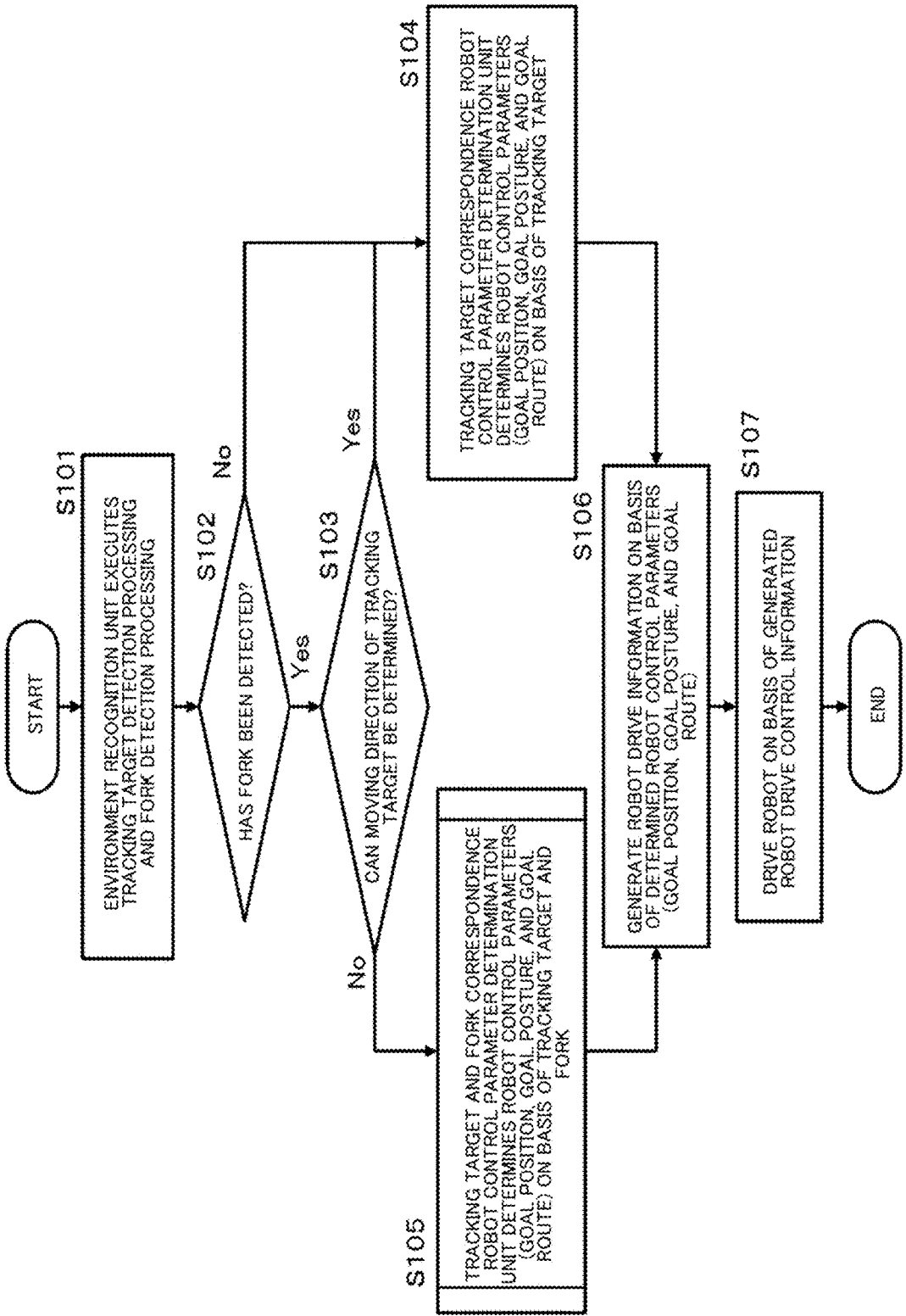
FIG. 3 is a diagram illustrating a flowchart for describing an overall control sequence of the mobile device (robot).

Processing according to the flowchart in FIG. 3 and subsequent figures can be executed according to a program stored in a storage unit of the mobile device (robot) 100, for example. For example, the processing is executed under the control of a data processing unit (control unit) having a CPU having a program execution function.

Hereinafter, the processing of respective steps in the flowchart illustrated in FIG. 3 will be sequentially described.
Step S101

First, in step S101, the environment recognition unit 110 of the mobile device (robot) 100 executes tracking target detection processing and fork detection processing.

As described above, the fork detection unit 111 detects the fork in the movement direction of the mobile device 100, that is, a junction of a plurality of routes, using the map or the detection data of the camera or the sensor, and generates fork detection information including information such as the configuration of the fork or the distance to the fork.

Further, the tracking target detection unit 112 analyzes the position, posture, distance, or the like of the tracking target using detection data of a camera or sensor, and generates tracking target detection information including these pieces of information.
Step S102

Processing of steps S102 and S103 is processing that is executed by the robot control parameter determination algorithm switching unit 121 of the robot control parameter determination unit 120.

The robot control parameter determination algorithm switching unit 121 of the robot control parameter determination unit 120 executes processing for switching between robot control parameter determination algorithms to be applied, on the basis of the input information from the environment recognition unit 110.

First, the robot control parameter determination algorithm switching unit 121 determines whether or not a fork has been detected on the basis of the input information from the environment recognition unit 110 in step S102.

Specifically, a determination as to whether or not a fork is detected in a traveling direction of the "tracking target" that the mobile device (robot) 100 is tracking is made on the basis of the fork detection information input from the fork detection unit 111.

When a determination is made that the fork has been detected, the processing proceeds to step S103.

On the other hand, when a determination is made that the fork has been detected, the processing proceeds to step S104.
Step S103

When a determination is made in step S102 that the fork has been detected, the processing proceeds to step S103.

In this case, the mobile device (robot) 100 determines in step S103 whether or not the movement direction at the fork of the "tracking target" that the mobile device (robot) 100 is tracking can be determined.

Specifically, the robot control parameter determination algorithm switching unit 121 of the robot control parameter determination unit 120 determines whether or not specifying the movement direction such as one of the plurality of routes of the fork that the tracking target selects and moves along can be performed on the basis of the tracking target detection information 202 input from the tracking target detection unit 112.

When the determination is made that specifying the movement direction such as one of the plurality of routes of the fork which the tracking target selects and moves along can be performed, the processing proceeds to step S104.

On the other hand, when a determination is made that the movement direction of the tracking target cannot be specified, that is, a determination is made that it is not possible to specify one of the plurality of routes constituting the fork which the tracking target selects and moves along, the processing proceeds to step S105.
Step S104

The processing of step S104 is executed
 (a) when a determination is made that no fork has been detected in step S102, or
 (b) when a determination is made in step S102 that the fork has been detected, and specifying one of the plurality of routes of the fork that the tracking target selects and moves along cannot be performed in step S103.

The processing of step S104 is processing that is executed by the tracking target correspondence robot control parameter determination unit 123 of the robot control parameter determination unit 120.

The tracking target correspondence robot control parameter determination unit 123 determines the robot control parameters, that is, the goal position, goal posture, and goal route using the tracking target detection information 202 including the position, posture, distance, or the like of the tracking target detected by the tracking target detection unit 112 of the environment recognition unit 110.

For this algorithm for determining the robot control parameters (goal position, goal posture, and goal route), an existing algorithm according to a general tracking-target tracking algorithm can be applied.
Step S105

The processing of step S105 is executed when the following is satisfied:
 (a) a determination is made that the fork has been detected in step S102, and
 (b) specifying the movement direction such as one of the plurality of routes of the fork that the tracking target selects and moves along cannot be performed in step S103.

The processing of step S105 is processing that is executed by the tracking target and fork correspondence robot control parameter determination unit 122 of the robot control parameter determination unit 120.

The tracking target and fork correspondence robot control parameter determination unit 122 determines the robot control parameters, that is, the goal position, goal posture, and goal route using the following input information:

(p) the fork detection information 201 including the configuration information of the fork detected by the fork detection unit 111, the distance information to the fork, and the like, and (q) the tracking target detection information 202 including the position, posture, distance, or the like of the tracking target detected by the tracking target detection unit 112.

Details of the algorithm for determining the robot control parameters (goal position, goal posture, and goal route) will be described below with reference to a flow illustrated in FIG. 4 and a detailed diagram illustrated in FIG. 5 and subsequent figures.

Step S106

When the robot control parameters (goal position, goal posture, and goal route) are determined in either step S104 or step S105, processing of step S106 is executed.

The processing of step S106 is processing that is executed by the robot drive information generation unit 131.

The robot drive information generation unit 131 generates drive information for moving the mobile device (robot) 100 along the input goal route and setting the goal posture at the goal position, on the basis of the robot control parameters (goal position, goal posture, and goal route) 211 and 212 input from the tracking target and fork correspondence robot control parameter determination unit 122 or the tracking target correspondence robot control parameter determination unit 123.

Step S107

Finally, in step S107, the robot is driven on the basis of the robot drive information generated in step S106.

This processing is executed by the robot drive unit 132.

The robot drive unit 132 drives the mobile device (robot) 100 according to the drive information input from the robot drive information generation unit 131.

As a result, the mobile device (robot) 100 reaches the goal position via the goal route, and is set to the goal posture at the goal position.

4. Details of Processing Executed by Tracking Target and Fork Correspondence Robot Control Parameter Determination Unit Next, details of processing that is executed by the tracking target and fork correspondence robot control parameter determination unit 122 of the robot control parameter 120 will be described.

Details of the processing of step S105 in the flowchart illustrated in FIG. 3 will be described below.

Step S105 of the flowchart illustrated in FIG. 3 is the processing that is executed by the tracking target and fork correspondence robot control parameter determination unit 122 of the robot control parameter determination unit 120 when (a) a determination is made that the fork has been detected in step S102, and (b) specifying a movement direction such as one of a plurality of routes of the fork that the tracking target selects to move along cannot be performed in step S103, are satisfied.

In this case, the tracking target and fork correspondence robot control parameter determination unit 122 of the robot control parameter determination unit 120 determines the robot control parameters, that is, the goal position, goal posture, and goal route using the following input information:

(p) the fork detection information 201 including the configuration information of the fork detected by the fork detection unit 111, the distance information to the fork, and the like, and (q) the tracking target detection information 202 including the position, posture, distance, or the like of the tracking target detected by the tracking target detection unit 112.

Figure 4:
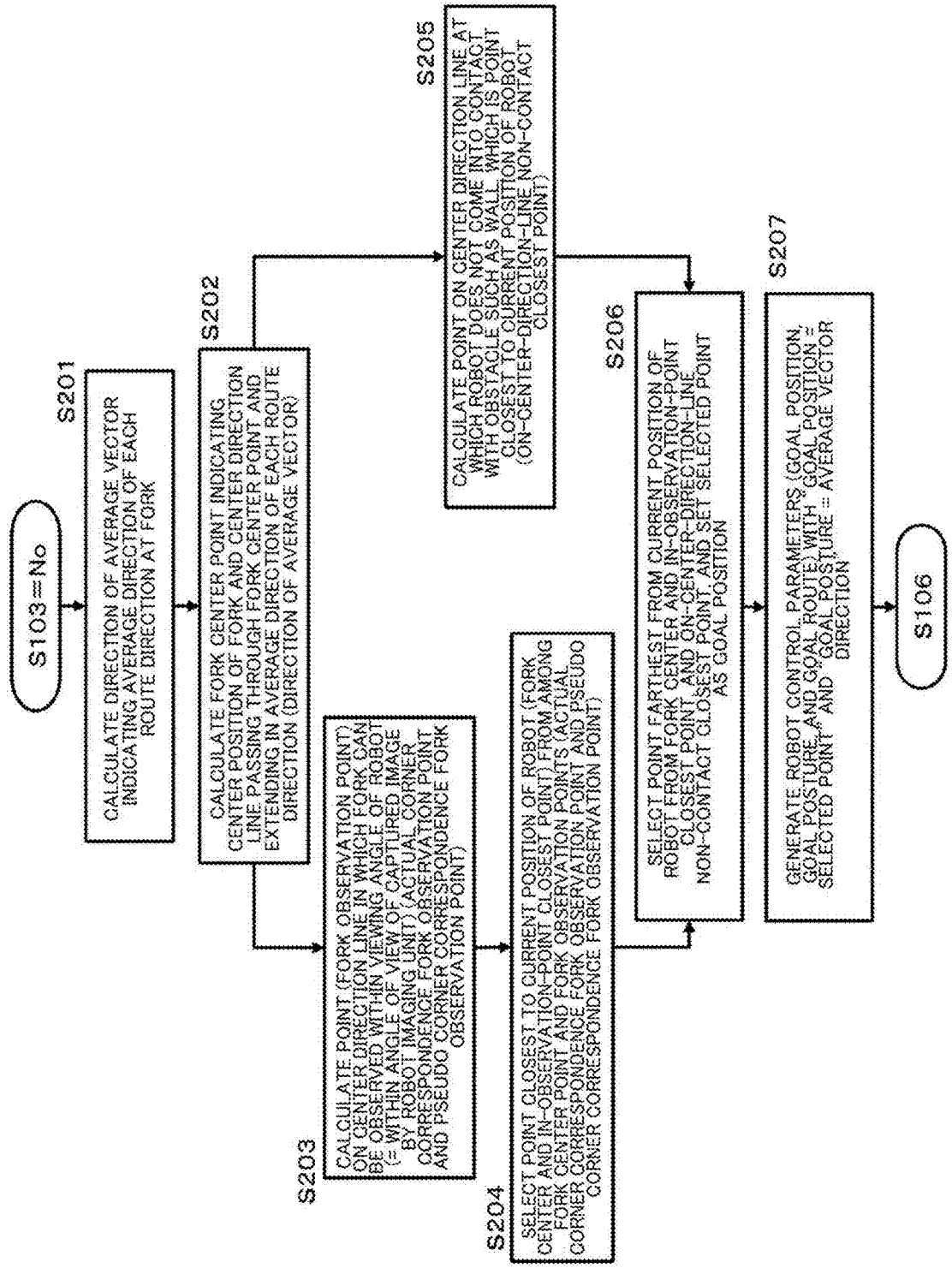
FIG. 4 is a diagram illustrating a flowchart for describing processing that is executed by a tracking target and fork correspondence robot control parameter determination unit of a robot control parameter determination unit.

FIG. 4 is a flowchart illustrating detailed sequence of the algorithm for determining the robot control parameters (goal position, goal posture, and goal route).

Figure 5:
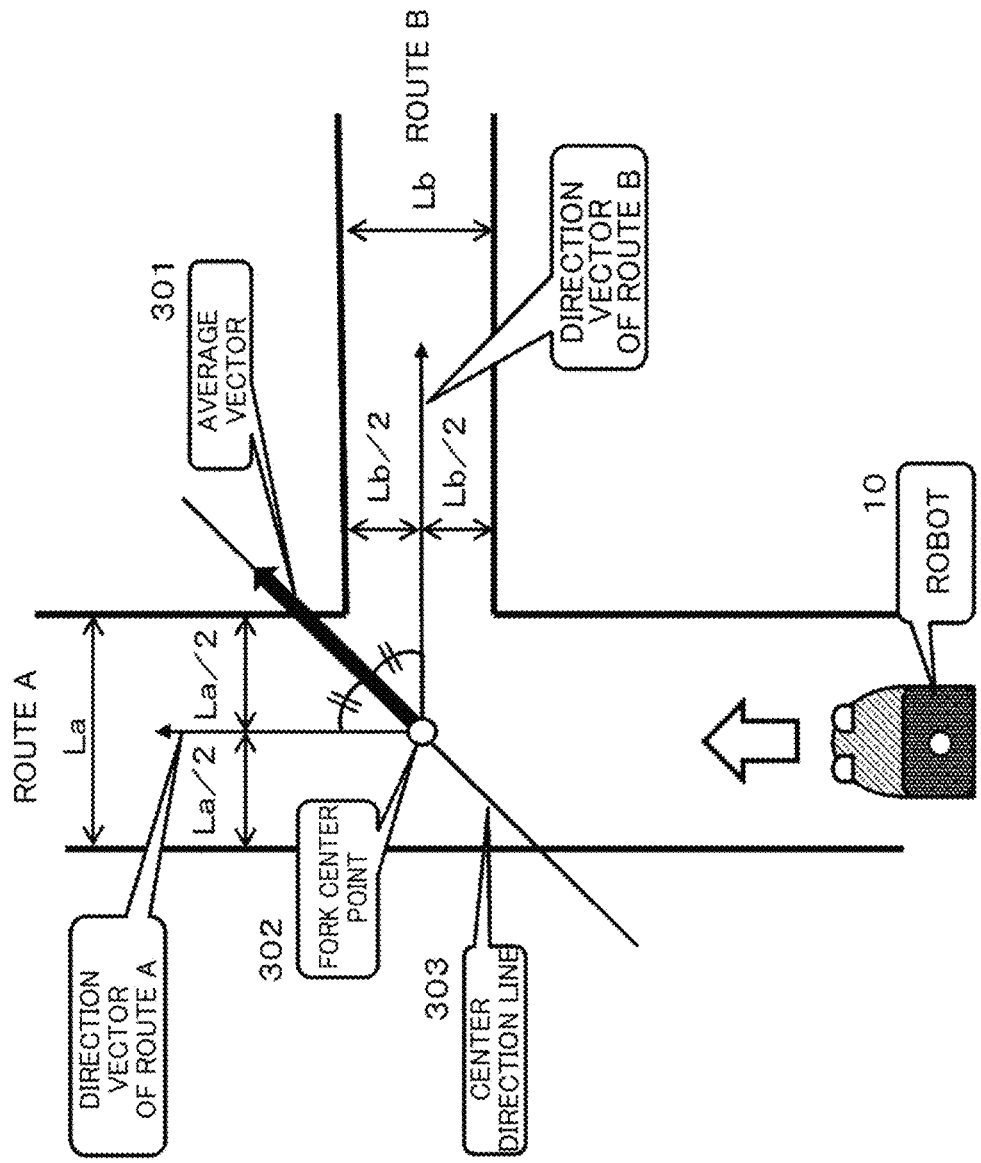
FIG. 5 is a diagram illustrating a specific example of processing that is executed by the tracking target and fork correspondence robot control parameter determination unit.

Further, FIG. 5 and subsequent figures are figures illustrating details of processing of each step of the flow illustrated in FIG. 4.

The processing according to the flow illustrated in FIG. 4 is executed in the tracking target and fork correspondence robot control parameter determination unit 122 of the robot control parameter determination unit 120.

Hereinafter, details of processing of respective steps in the flow illustrated in FIG. 4 will be sequentially described with reference to FIG. 5 and subsequent figures.

Step S201

First, the tracking target and fork correspondence robot control parameter determination unit 122 of the robot control parameter determination unit 120 calculates a direction of an average vector indicating an average direction of each route direction at the fork in step S201.

Details of processing of step S201 will be described with reference to FIG. 5. The robot 10 is illustrated in FIG. 5. The robot 10 tracks the tracking target 20, as described above with reference to FIG. 1.

FIG. 5 is a diagram illustrating the processing of step S201, that is, processing for calculating the direction of the average vector indicating the average direction of each route direction at the fork, and does not show the tracking target 20 to avoid complication.

The tracking target is at a position at which it is impossible to determine which of routes of the fork including routes A and B is selected. Specifically, the tracking target exists at a position on the front side (robot 10 side) from an approximate center of the fork, like the position illustrated in FIG. 1(1) described above.

In step S201, the tracking target and fork correspondence robot control parameter determination unit 122 calculates the direction of the average vector indicating the average direction of each route direction at the fork.

The fork illustrated in FIG. 5 includes two orthogonal routes including route A and route B.

The tracking target and fork correspondence robot control parameter determination unit 122 first sets a direction vector indicating the direction of each of the two routes A and B for each route.

The direction vectors are a direction vector of route A and a direction vector of route B illustrated in the figure.

A direction of a center of a direction of the direction vector of route A and a direction of the direction vector of route B is calculated as the direction of the average vector indicating the average direction of each route direction at the fork. For example, an average vector 301 having the direction as illustrated in FIG. 5 is calculated.

For the average vector 301, a direction of the average vector 301 may be defined, and a length and position of the average vector 301 need not be limited. For example, the average vector 301 may be a unit vector with length=1.

Step S202

Next, the tracking target and fork correspondence robot control parameter determination unit 122 executes the following processing in step S202.

A fork center point indicating a center position of the fork and a center direction line passing through the fork center point and extending in an average direction of each route direction (the direction of the average vector) are calculated.

Processing of step S202 will also be described with reference to FIG. 5. Direction vectors indicating route directions of two routes A and B, that is, a "direction vector of route A" and a "direction vector of route B" illustrated in FIG. 5 are set at a center position of each route.

Further, an intersection among extended lines of the direction vectors corresponding to the routes at the fork is defined as a fork center point 302. As illustrated in FIG. 5, the fork center point 301 is set at a position of an intersection between a center line of route A and a center line of route B.

Next, the tracking target and fork correspondence robot control parameter determination unit 122 calculates a center direction line 303 passing through the fork center point 302.

The center direction line 303 is set as a straight line in a direction in which an angle formed by center lines of route A and route B is bisected, that is, a straight line passing through the fork center point 302 and being parallel to the average vector direction calculated in step S201.

Step S203

Processing of steps S203 and S204 and processing of step S205 can be executed in parallel.

That is, the processing of steps S203 and S204 and the processing of step S205 can be executed in parallel because the processing can be executed independently. However, the parallel execution is not essential, and the processing of step S205 may be executed after the processing of steps S203 and S204, or the processing of step S205 may be executed before the processing of steps S203 and S204.

First, the processing of step S203 will be described.

The tracking target and fork correspondence robot control parameter determination unit 122 executes the following processing in step S203.

A point (fork observation point) on the center direction line 303 in which the fork can be observed within the viewing angle of the robot (for example, within an angle of view of a camera-captured image of the robot) is calculated. The fork observation point includes an actual corner correspondence fork observation point and a pseudo corner correspondence fork observation point.

The center direction line 303 is the line calculated in step S202, and is set as a straight line in a direction in which an angle formed by center lines of route A and route B constituting the fork is bisected as described with reference to FIG. 5, that is, a straight line passing through the fork center point 302 and being parallel to the average vector direction calculated in step S201.

In step S203, a "fork observation point" which is a point at which a fork can be observed on the center direction line 303 and within the viewing angle of the robot (for example, within a viewing angle of a camera-captured image of the robot) is calculated. The "fork observation point" includes an "actual corner correspondence fork observation point" and a "pseudo corner correspondence fork observation point".

First, the "actual corner correspondence fork observation point" will be described with reference to FIG. 6.

Figure 6:
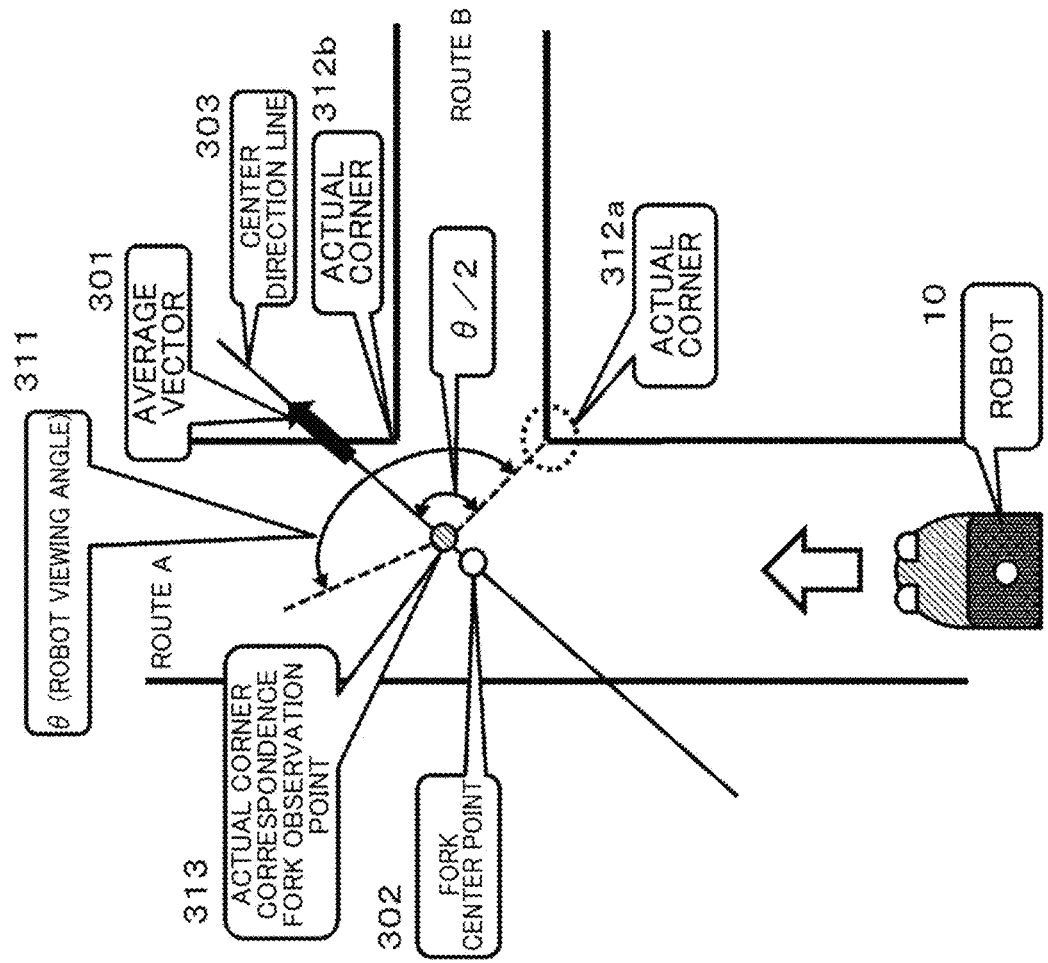
FIG. 6 is a diagram illustrating a specific example of processing that is executed by the tracking target and fork correspondence robot control parameter determination unit.

FIG. 6 illustrates the average vector 301, the fork center point 302, and the center direction line 303 calculated in steps S201 and S202.

For the average vector 301, the direction of the average vector 301 may be defined, and the length and position of the average vector 301 need not be limited as described above, and FIG. 6 illustrates the average vector 301 with a position and length different from those in FIG. 5.

In step S203, a position of the "actual corner correspondence fork observation point" on the center direction line 303 is calculated.

In the example illustrated in FIG. 6, it is assumed that the robot 10 travels on the center direction line 303 and is directed in the direction of the average vector 301. The viewing angle of the robot 10 in this case is θ. The viewing angle of the robot 10 is an angle that can be recognized by the robot 10 using detection data of a camera or a sensor. For example, the viewing angle corresponds to an angle of view of the camera-captured image when the robot 10 is configured to perform object recognition using only the camera-captured image.

The viewing angle θ of the robot 10 when the robot 10 moves on the center direction line 303 and is directed in the direction of the average vector 301 is bisected left and right by the center direction line 303, and a viewing angle of θ/2 is set on the right side of the center direction line 303, as illustrated in FIG. 6.

As illustrated in FIG. 6, an "actual corner correspondence fork observation point 313" is an end point on the center direction line 303 in which an "actual corner 312*a*" illustrated in FIG. 6 falls within the viewing angle θ of the robot 10. The "actual corner" is a "corner area" in which a route that constitutes the fork actually exists. In the example illustrated in FIG. 6, the "actual corner" includes two places including an actual corner 312*a* and an actual corner 312*b*, but the "actual corner 312*a*" is a corner that deviates from the viewing angle θ of the robot 10 first when the robot 10 travels on the center direction line 303 in the direction of the average vector 301 (an upper right direction in FIG. 6).

The "actual corner correspondence fork observation point 313" is calculated in consideration of the corner that deviates from the viewing angle θ of the robot 10 first when the robot 10 travels on the center direction line 303 in the direction of the average vector 301 (an upper right direction in FIG. 6).

When the robot 10 travels on the center direction line 303 from the "actual corner correspondence fork observation point 313", that is, when the robot 10 travels on the center direction line 303 in the direction of the average vector 301 (the upper right direction in FIG. 6), the "actual corner 312*a*" illustrated in FIG. 6 deviates from the viewing angle θ of the robot 10, and the robot 10 cannot recognize the "actual corner 312*a*".

Thus, the "actual corner correspondence fork observation point 313" is the end point on the center direction line 303 that falls within the viewing angle θ of the robot 10. That is, the point is calculated as the farthest point (a point farthest from the current position of the robot 10) on the center direction line 303 at which the robot 10 directed in the direction of the average vector 301 can recognize the "actual corner 312*a*".

The processing described with reference to FIG. 6 is processing of calculating the "actual corner correspondence fork observation point 313" on the center direction line 303 on which the "actual corner 312a" of the fork can be observed within the viewing angle of the robot (for example, within the angle of view of the camera-captured image of the robot).

In step S203, as the point (fork observation point) on the center direction line 303 in which the fork can be observed within the viewing angle of the robot (for example, within the angle of view of the camera-captured image of the robot), not only the "actual corner correspondence fork observation point", but also the "pseudo corner correspondence fork observation point" are calculated.

The "actual corner correspondence fork observation point" is a position at which the existing corner 312a falls within the viewing angle of the robot 10, as described with reference to FIG. 6.

On the other hand, the "pseudo corner correspondence fork observation point" is a position at which a nonexistent pseudo corner (pseudo corner area) falls within the viewing angle of the robot 10.

Figure 7:
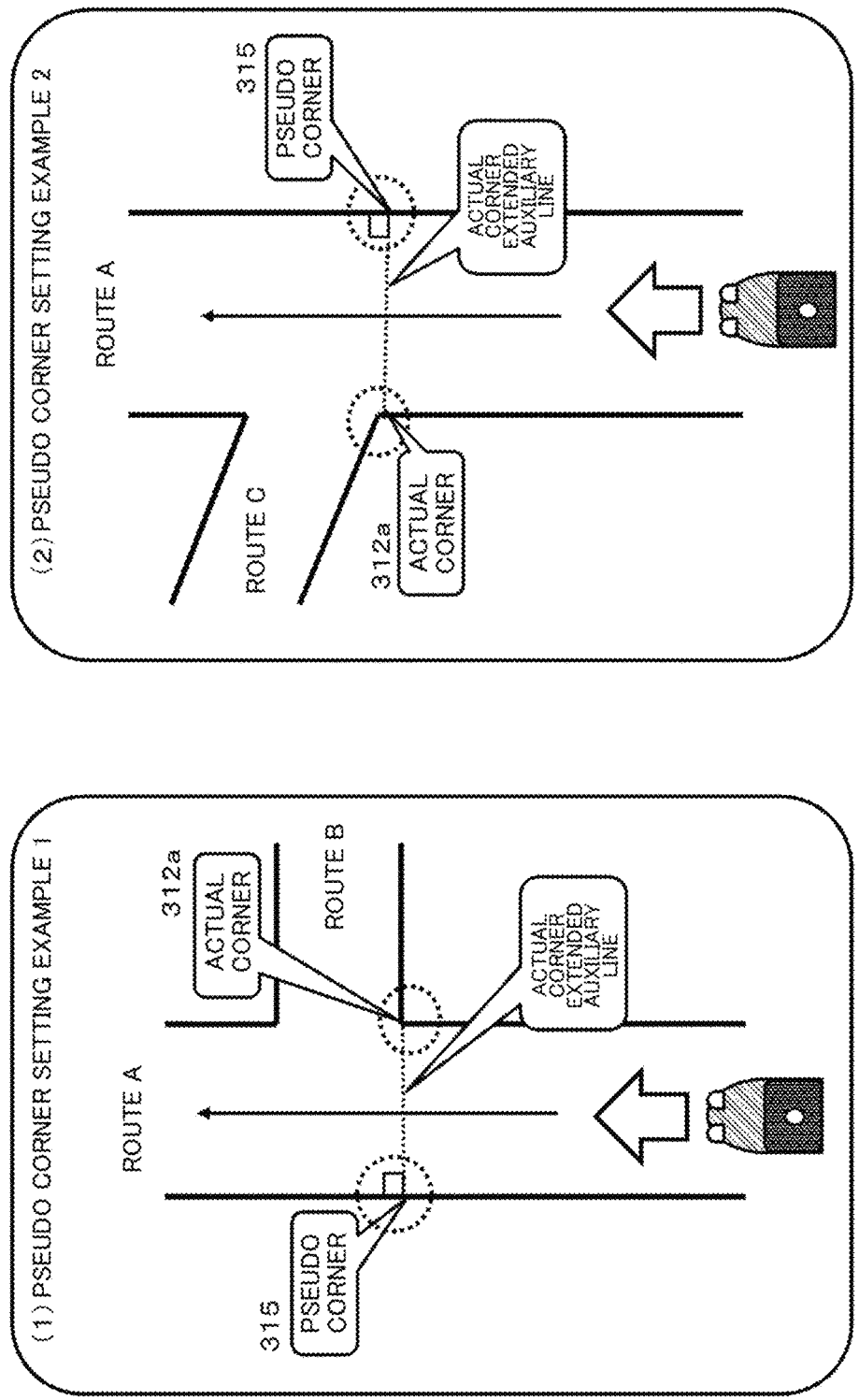
FIG. 7 is a diagram illustrating a pseudo corner.

The pseudo corner (pseudo corner area) will be described with reference to FIG. 7. FIG. 7 illustrates positions of "pseudo corners" at two different forks.

As illustrated in FIG. 7, a pseudo corner 315 is a corner area that does not actually exist at the fork, and is defined as a position of an intersection between an "actual corner extended auxiliary line", which is a line perpendicular to a route facing surface from the actual corner 312a that actually exist at the fork, and the "route facing surface".

In step S203, a position of the "pseudo corner correspondence fork observation point" is calculated using a position of the "pseudo corner 315".

Processing for calculating the position of the "pseudo corner correspondence fork observation point" will be described with reference to FIG. 8.

Figure 8:
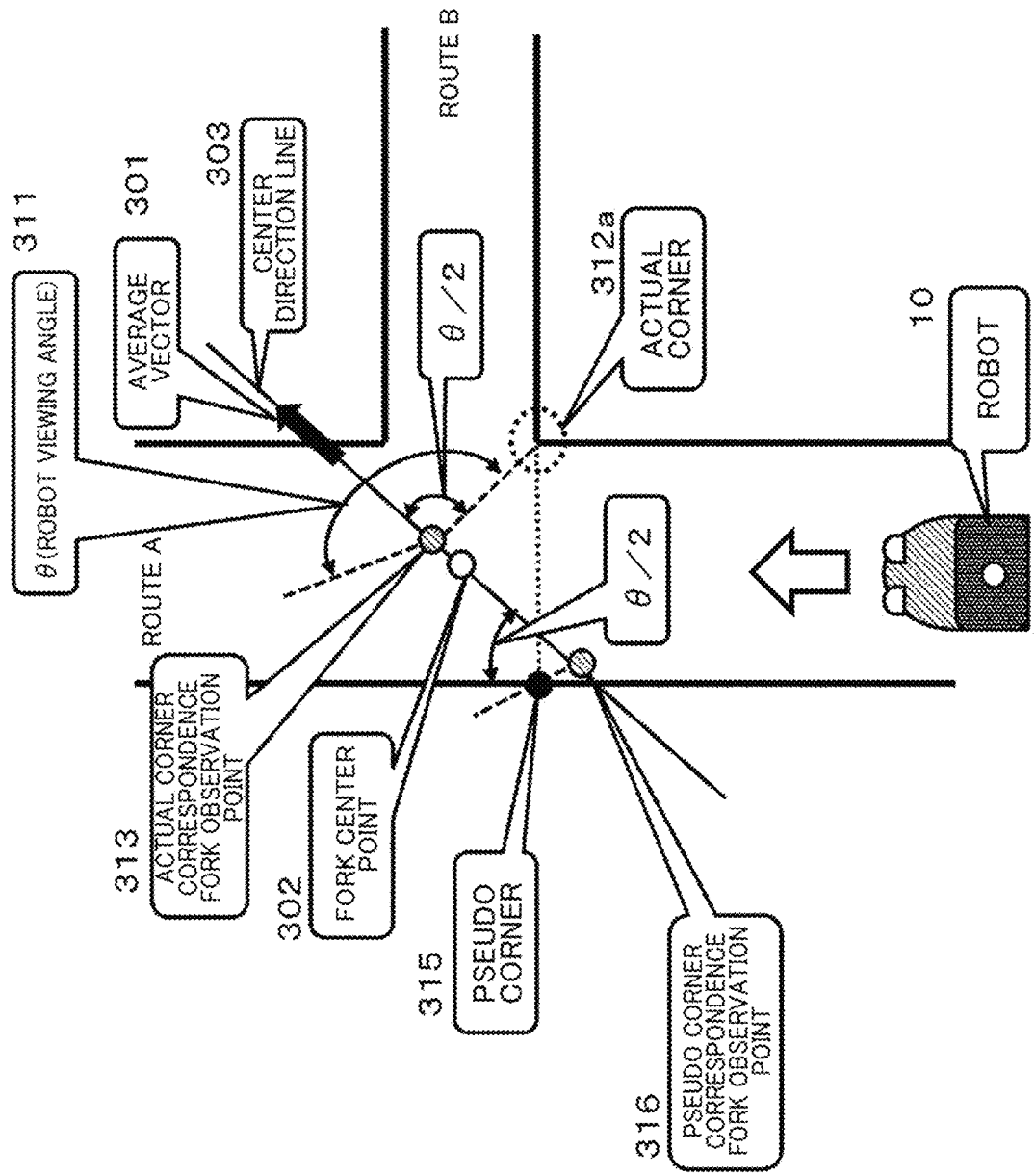
FIG. 8 is a diagram illustrating a specific example of processing that is executed by the tracking target and fork correspondence robot control parameter determination unit.

First, the position of the "pseudo corner 315" is calculated as illustrated in FIG. 8. The "actual corner extended auxiliary line" that is a line perpendicular to the route facing surface from the "actual corner 312a" is set, and a "pseudo corner 315" is set at a position of an intersection between the "actual corner extended auxiliary line" and the "route facing surface".

Next, as illustrated in FIG. 8, the "pseudo corner correspondence fork observation point 316" is set as an end point on the center direction line 303 on which the "pseudo corner 315" illustrated in FIG. 8 falls within the viewing angle θ of the robot 10.

The "pseudo corner correspondence fork observation point 316" is set and calculated at a position finally deviating from the viewing angle θ of the robot 10 when the robot 10 travels on the center direction line 303 in the direction of the average vector 301 (an upper right direction in FIG. 8).

When the robot 10 travels on the center direction line 303 from the "pseudo corner correspondence fork observation point 316" illustrated in FIG. 8, that is, when the robot 10 travels on the center direction line 303 in the direction of the average vector 301 (an upper right direction in FIG. 8), the "pseudo corner 315" illustrated in FIG. 8 deviates from the viewing angle θ of the robot 10, and the robot 10 cannot recognize the "pseudo corner 315".

Thus, the "pseudo corner correspondence fork observation point 316" is an end point on the center direction line 303 that falls within the viewing angle θ of the robot 10. That is, the point is calculated as the farthest point (a point farthest from the current position of the robot 10) on the center direction line 303 at which the robot 10 directed in the direction of the average vector 301 can recognize the "pseudo corner 315".

Thus, in step S203, as the point (fork observation point) on the center direction line 303 in which the fork can be observed within the viewing angle of the robot (for example, within the angle of view of the camera-captured image of the robot), the "actual corner correspondence fork observation point" and the "pseudo corner correspondence fork observation point" are calculated.

Step S204

Next, the tracking target and fork correspondence robot control parameter determination unit 122 executes the following processing in step S204.

A point closest to the current position of the robot 10 (a fork center and in-observation-point closest point) is selected from respective points of the fork center point 302 and the fork observation points (the actual corner correspondence fork observation point 313 and the pseudo corner correspondence fork observation point 316).

That is,
(a) the fork center point 302 calculated in step S202,
(b) the fork observation points (the actual corner correspondence fork observation point 313 and the pseudo corner correspondence fork observation point 316) calculated in step S203.

The point closest to the current position of the robot 10 is selected from these points as the "fork center and in-observation-point closest point".

The processing of step S204 will be described with reference to FIG. 9.

Figure 9:
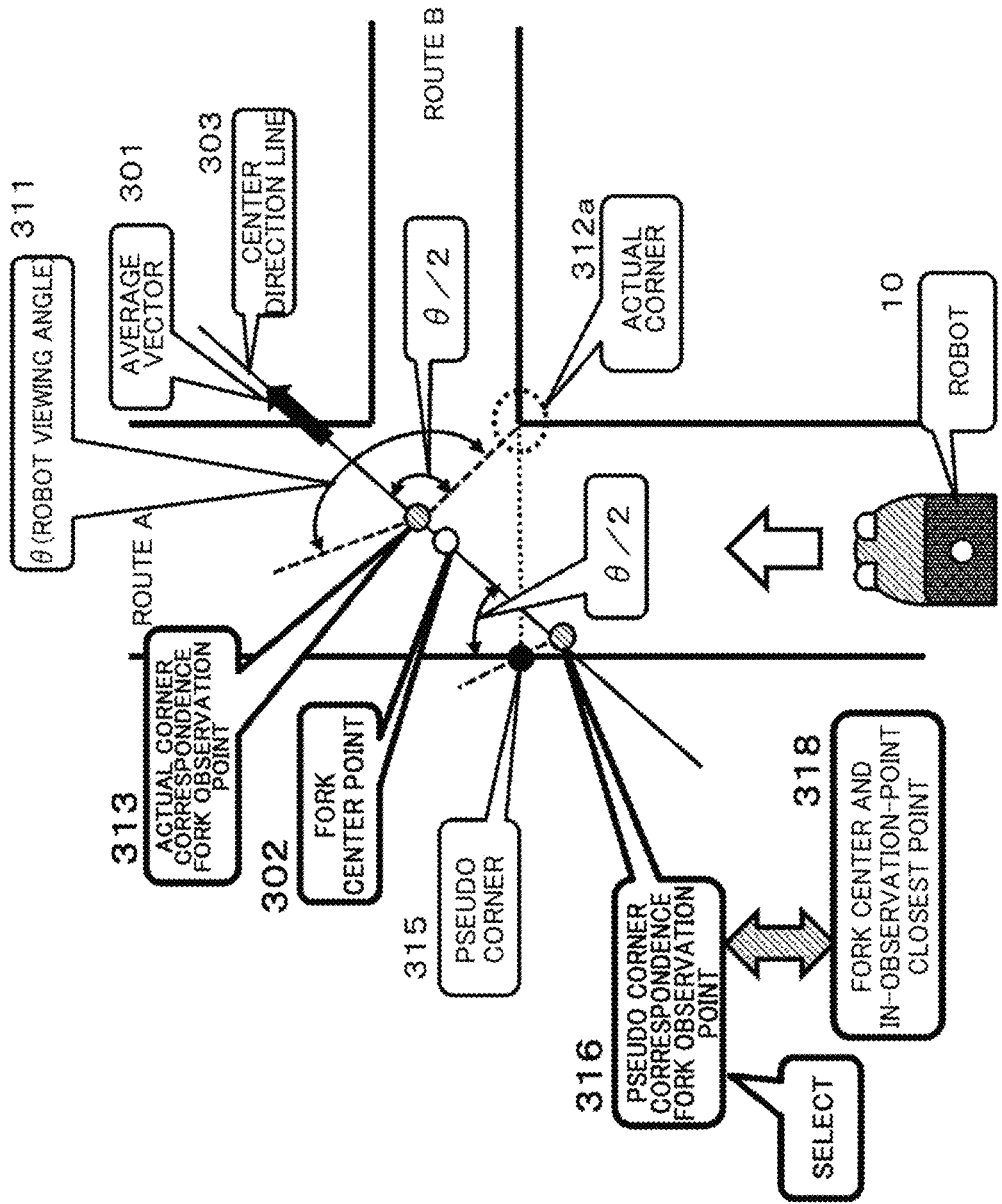
FIG. 9 is a diagram illustrating a specific example of processing that is executed by the tracking target and fork correspondence robot control parameter determination unit.

FIG. 9 illustrates three points including the fork center point 302 calculated in step S202, the actual corner correspondence fork observation point 313 which is the fork observation point calculated in step S203, and the pseudo corner correspondence fork observation point 316.

In step S204, the point closest to the current position of the robot 10 is selected from among these three points as the "fork center and in-observation-point closest point".

In the example illustrated in FIG. 9, the point closest to the current position of the robot 10 among the fork center point 302, the actual corner correspondence fork observation point 313, and the pseudo corner correspondence fork observation point 316 is the pseudo corner correspondence fork observation point 316.

Therefore, in the example illustrated in FIG. 9, the pseudo corner correspondence fork observation point 316 is selected as a "fork center and in-observation-point closest point 318".

A positional relationship among the fork center point 302, the actual corner correspondence fork observation point 313, and the pseudo corner correspondence fork observation point 316 varies depending on the configuration of the fork or the viewing angle of the robot 10. Therefore, which of the three points is selected as the "fork center and in-observation-point closest point 318" changes depending on the configuration of the fork or the viewing angle of the robot 10.

Step S205

Next, the processing of step S205 of the flow illustrated in FIG. 4 will be described.

As described above, the processing of step S205 can be executed in parallel with the processing of steps S203 and S204 described above.

The tracking target and fork correspondence robot control parameter determination unit 122 executes the following processing in step S205.

A point on the center direction line that does not contact an obstacle such as a wall, which is a point closest to the current position of the robot (on-center-direction-line non-contact closest point) is calculated.

Figure 10:
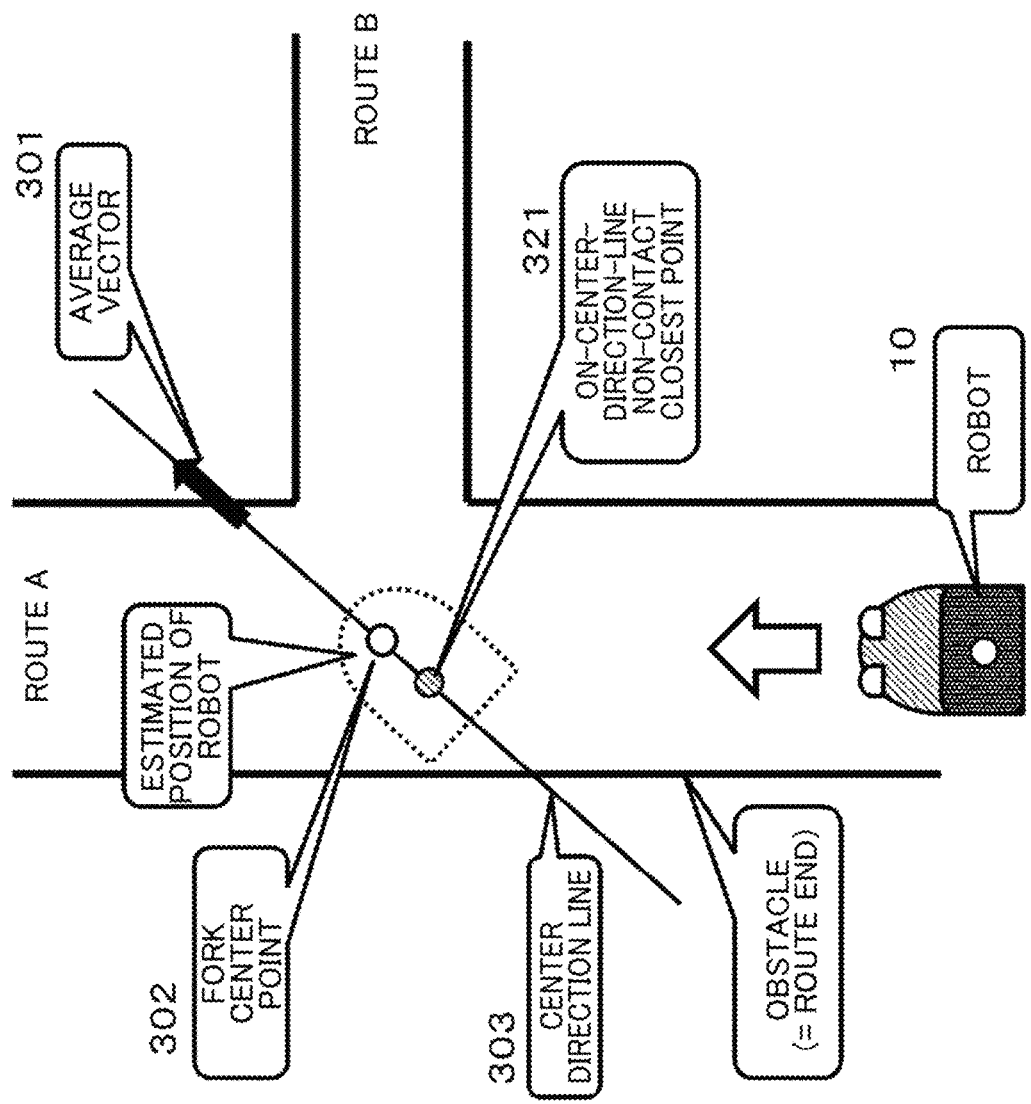
FIG. 10 is a diagram illustrating a specific example of processing that is executed by the tracking target and fork correspondence robot control parameter determination unit.

The processing of step S205 will be described with reference to FIG. 10. In FIG. 10, a position at which the robot does not come into contact with the "obstacle such as a wall" in a posture with the direction of the average vector 301 as a forward direction on the center direction line 303, which is closest to the current position of the robot, is indicated as an "estimated robot position" by a dashed line.

In this example, the "obstacle such as a wall" is an end of route A herein.

In step S205, the "estimated robot position" indicated by the dashed line in FIG. 10 is calculated. That is, the position at which the robot does not come into contact with the "obstacle such as a wall" in the posture with the direction of the average vector 301 as the forward direction on the center direction line 303 is calculated as an on-center-direction-line non-contact closest point 321.

Step S206

Next, the processing of step S206 in the flow illustrated in FIG. 4 will be described.

The processing of step S206 is executed after the processing of steps S203 and S204 and the processing of step S205 described above are completed.

The tracking target and fork correspondence robot control parameter determination unit 122 executes the following processing in step S206.

The point farthest from the current position of the robot is selected from the fork center and in-observation-point closest point and the on-center-direction-line non-contact closest point, and the selected point is set as the goal position.

That is, the point farthest from the current position of the robot 10 is selected from two points:
  (a) the fork center and in-observation-point closest point 318 calculated in step S204, and
  (b) the on-center-direction-line non-contact closest point 321 calculated in step S205,
and the selected point is set as the goal position.

This processing will be described with reference to FIG. 11.

Figure 11:
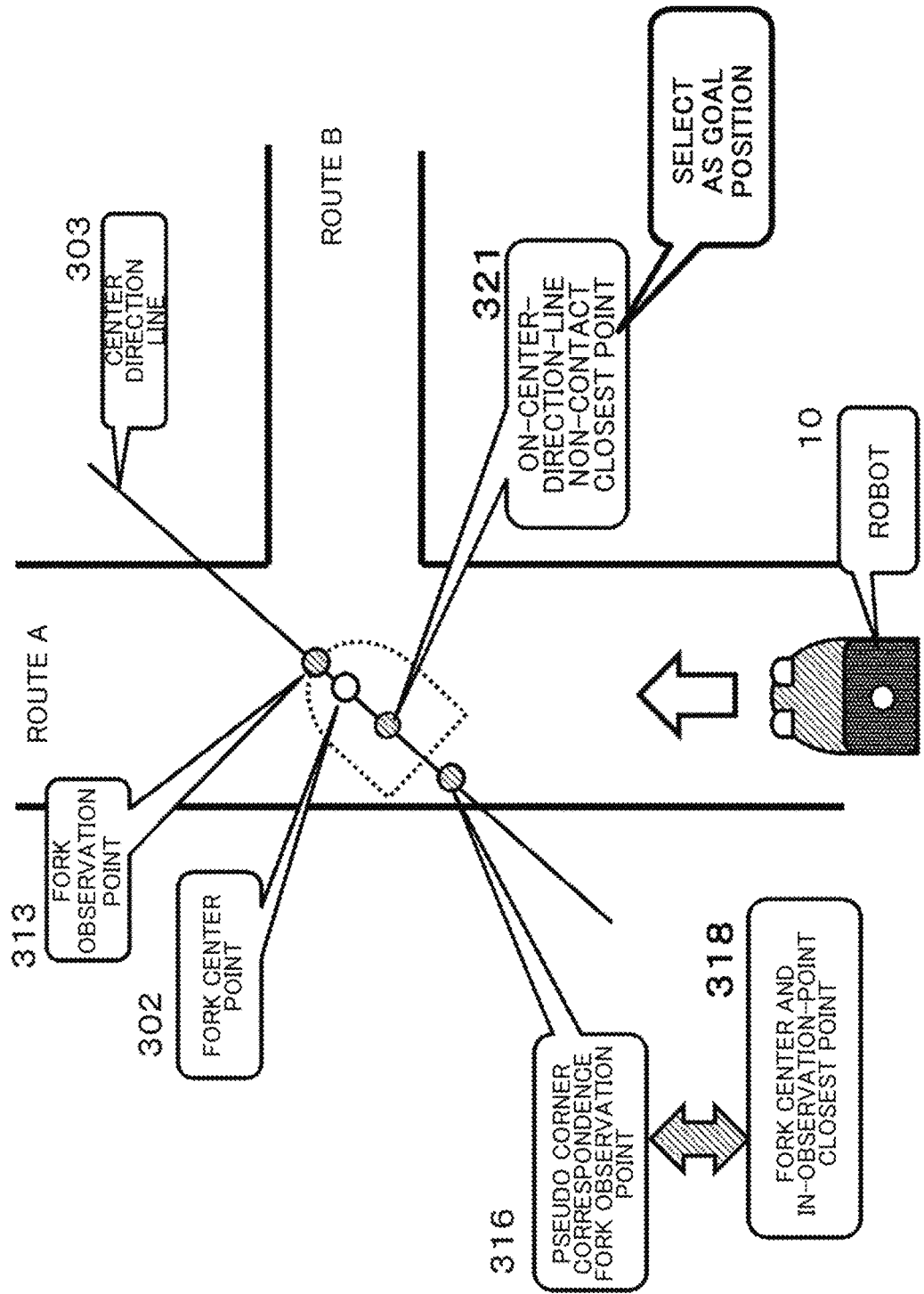
FIG. 11 is a diagram illustrating a specific example of processing that is executed by the tracking target and fork correspondence robot control parameter determination unit.

In FIG. 11, two points:
  (a) the fork center and in-observation-point closest point 318 calculated in step S204, and
  (b) the on-center-direction-line non-contact closest point 321 calculated in step S205
are shown.

In step S206, the point farthest from the current position of the robot 10 is selected from the two points, and the selected point is set as the goal position.

In the example illustrated in FIG. 11, a point farthest from the current position of the robot 10 between the fork center and in-observation-point closest point 318 and the on-center-direction-line non-contact closest point 321 is the on-center-direction-line non-contact closest point 321, and this on-center-direction-line non-contact closest point 321 is selected as the "goal position".

A setting of the fork center and in-observation-point closest point and the on-center-direction-line non-contact closest point varies depending on the configuration of the fork or the viewing angle of the robot 10. Therefore, which of the fork center and in-observation-point closest point and the on-center-direction-line non-contact closest point is selected as the "goal position" changes depending on the configuration of the fork or the viewing angle of the robot 10.

Step S207

Next, the processing of step S207, which is the last step of the flow illustrated in FIG. 4, will be described.

The tracking target and fork correspondence robot control parameter determination unit 122 executes the following processing in step S207.

Robot control parameters (goal position, goal posture, and goal route) with "goal position=selected point" and "goal posture=average vector direction" are generated.

A specific example of the processing of step S207 will be described with reference to FIGS. 12 and 13.

Figure 12:
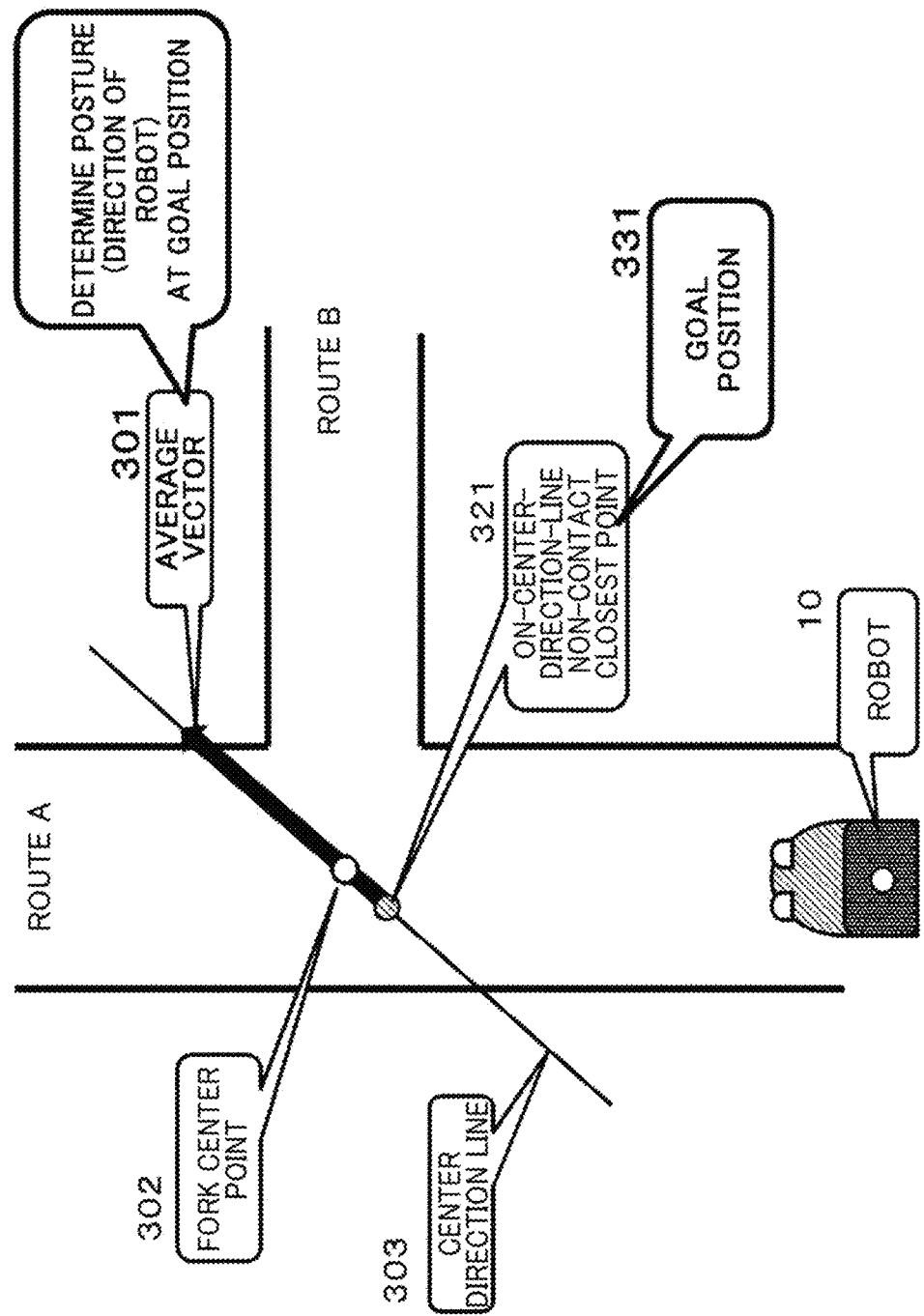
FIG. 12 is a diagram illustrating a specific example of processing that is executed by the tracking target and fork correspondence robot control parameter determination unit.

FIG. 12 illustrates the goal position 331 determined in step S206

In step S207, first, the goal posture is determined in the direction of the average vector 301 calculated in step S201.

In step S207, the goal route is determined on the basis of the goal position and goal posture.

Figure 13:
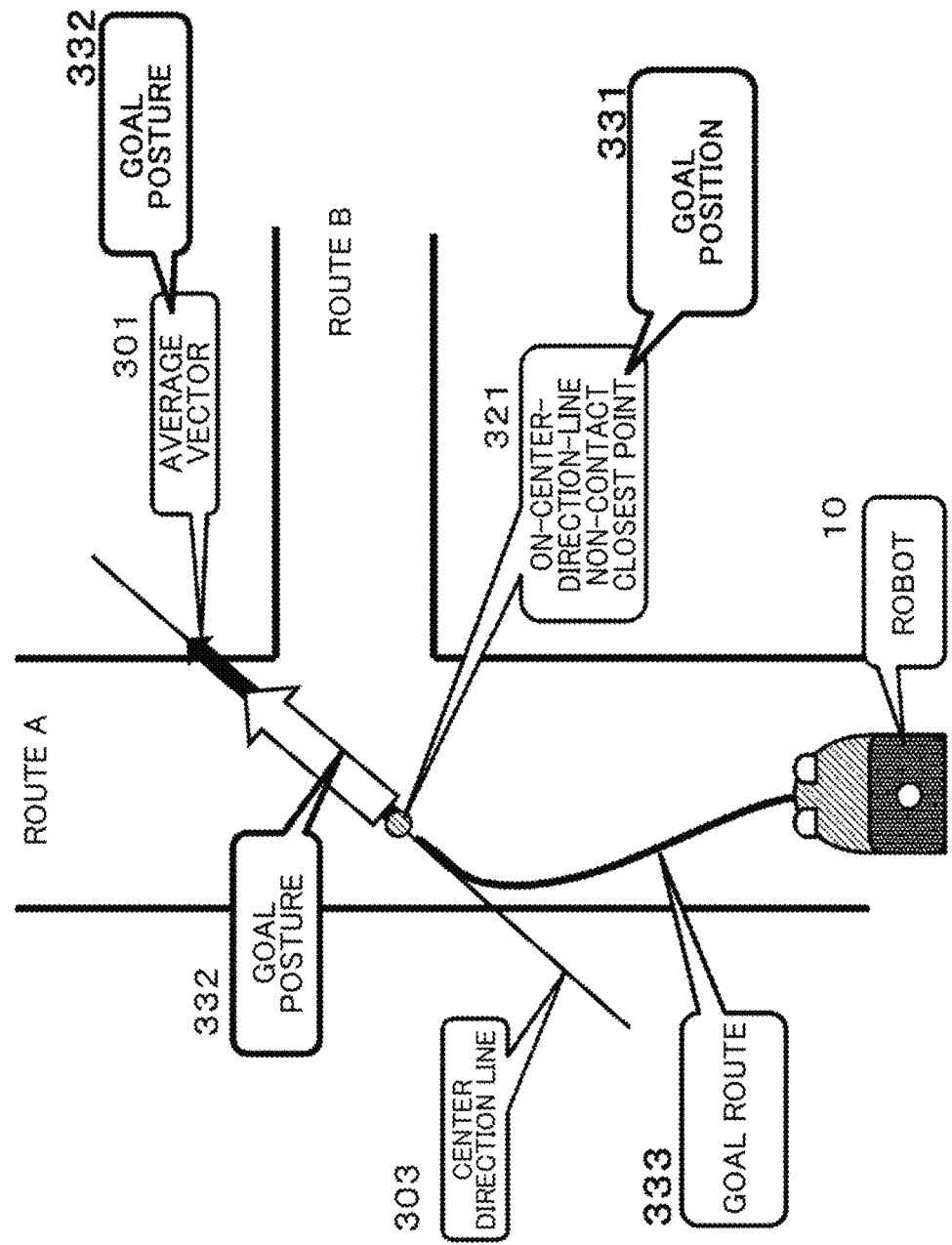
FIG. 13 is a diagram illustrating a specific example of processing that is executed by the tracking target and fork correspondence robot control parameter determination unit.

FIG. 13 illustrates the goal position 331, goal posture 332, and goal route 333 determined in step S207.

As illustrated in FIG. 13, the goal position 331 is the point selected in step S206, that is, a selected point selected from the fork center and in-observation-point closest point 318 and the on-center-direction-line non-contact closest point 321. The goal posture 332 is the direction of the average vector 301 calculated in step S201.

The goal route 333 is a route for setting "goal posture 332=average vector direction" at the "goal position 331", and various existing algorithms can be applied as a route generation algorithm.

For example, a current position and posture of the robot 10, the "goal position 331", and the "goal posture 332=average vector direction" are considered to calculate a smooth route. Specifically, route generation in which a scheme such as "Hybrid A Star (Hybrid A*)" or Dynamic Window Approach (DWA) that is an existing route generation algorithm, or machine learning data has been applied is possible.

Thus, the tracking target and fork correspondence robot control parameter determination unit 122 generates the robot control parameters (goal position, goal posture, and goal route) as the "goal position 331", and the "goal posture 332=average vector direction" in step S207.

As described above, in step S105 of the flow illustrated in FIG. 3, processing according to steps S201 to S207 of the flow illustrated in FIG. 4 is executed.

That is, the tracking target and fork correspondence robot control parameter determination unit 122 determines the robot control parameters, that is, the goal position, goal posture, and goal route using input information (p) and (q):
  (p) the fork detection information 201 including the configuration information of the fork detected by the fork detection unit 111 illustrated in FIG. 2, the distance information to the fork, and the like, and
  (q) the tracking target detection information 202 including the position, posture, distance, or the like of the tracking target detected by the tracking target detection unit 112 illustrated in FIG. 2
according to the flow illustrated in FIG. 4.

The robot control parameters (goal position, goal posture, and goal route) generated by the tracking target and fork correspondence robot control parameter determination unit 122 are output to the robot drive information generation unit 131, as illustrated in FIG. 2.

The robot drive information generation unit 131 executes the processing of step S106 in the flow illustrated in FIG. 3.

That is, the robot drive information generation unit 131 generates drive information for moving the mobile device (robot) 100 along the input goal route and setting the goal posture at the goal position, on the basis of the robot control parameters (goal position, goal posture, and goal route) 211 and 212 input from the tracking target and fork correspondence robot control parameter determination unit 122 or the tracking target correspondence robot control parameter determination unit 123.

Further, in step S107 of the flow illustrated in FIG. 3, the robot is driven on the basis of the robot drive information generated in step S106.

This processing is executed by the robot drive unit 132.

The robot drive unit 132 drives the mobile device (robot) 100 according to the drive information input from the robot drive information generation unit 131.

As a result, the mobile device (robot) 100 reaches the goal position via the goal route, and is set to the goal posture at the goal position.

Thus, in the processing for the present disclosure, the robot 10 is moved according to the robot control parameters (goal position, goal posture, and goal route) generated by the tracking target and fork correspondence robot control parameter determination unit 122, according to the processing described with reference to FIG. 4 in a state in which it is not possible to estimate one of the routes constituting the fork which the tracking target 20 selects and moves along at the fork.

By performing this control, the robot 10 can reduce a possibility that the tracking target 20 will deviate from the viewing angle of the robot 10, bring the tracking target 20 within the viewing angle of the robot 10, and can reliably track the tracking target 20 even in a state in which one of the routes constituting the fork which the tracking target 20 selects and moves along at the fork cannot be estimated.

5. Example of Generation of Control Parameters (Goal Position, Goal Posture, and Goal Route) for Robots with Different Viewing Angles Next, an example of generation of the control parameters (goal position, goal posture, and goal route) for robots with different viewing angles will be described.

The robot control parameters (goal position, goal posture, and goal route) generation example described with reference to FIGS. 5 to 13 is, for example, a parameter generation example when there is the robot viewing angle (θ) as illustrated in FIG. 6.

The robot viewing angle (θ) illustrated in FIG. 6 is about θ≈160°, and (θ/2) illustrated in FIG. 6 is about 80°.

There are various viewing angles of the robot 10, and the tracking target and fork correspondence robot control parameter determination unit 122 generates robot control parameters (goal position, goal posture, and goal route) different according to the robot viewing angles.

That is, the processing that is executed by the tracking target and fork correspondence robot control parameter determination unit 122 described above with reference to the flowchart illustrated in FIG. 4 is processing different depending on the robot viewing angles.

Hereinafter, details of processing when the robot viewing angle (θ) is a wide viewing angle of about θ≈300°, that is, processing of each step of the flow illustrated in FIG. 4 will be described with reference to FIG. 14 and subsequent figures.

Figure 14:
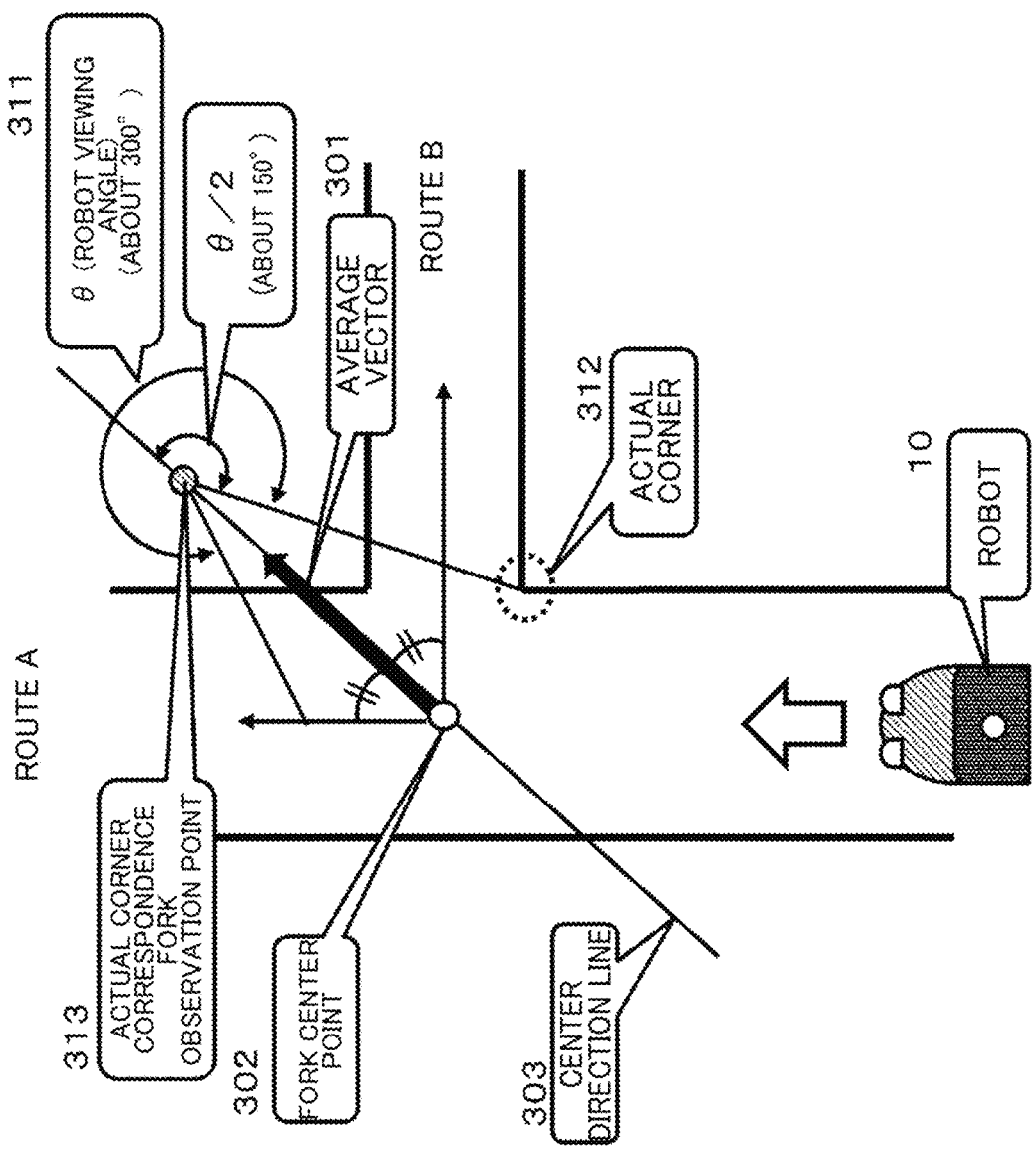
FIG. 14 is a diagram illustrating a specific example of processing that is executed by the tracking target and fork correspondence robot control parameter determination unit.

In this processing example, the robot 10 has a viewing angle (θ) that is a wide viewing angle of about θ≈300°, as illustrated in FIG. 14.

Hereinafter, a specific example of the robot control parameters (goal position, goal posture, and goal route) generation processing executed by the tracking target and fork correspondence robot control parameter determination unit 122 for the robot 10 having a wide viewing angle of about θ≈300° will be described. Hereinafter, a specific example of processing of each step in the flow illustrated in FIG. 4 will be described below with reference to FIG. 14 and subsequent figures.

Step S201

First, the tracking target and fork correspondence robot control parameter determination unit 122 of the robot control parameter determination unit 120 calculates the direction of the average vector indicating the average direction of each route direction at the fork in step S201.

Details of the processing of step S201 will be described with reference to FIG. 14.

The fork illustrated in FIG. 14 includes two orthogonal routes including route A and route B.

The tracking target and fork correspondence robot control parameter determination unit 122 first sets a direction vector indicating a direction of each route for each of the two routes A and B.

The direction vectors are the direction vector of route A and the direction vector of route B illustrated in the figure.

A direction of a center of a direction of the direction vector of route A and a direction of the direction vector of route B is calculated as the direction of the average vector 301 indicating the average direction of each route direction at the fork.

This average vector 301 is independent of the viewing angle of the robot 10, and the same average vector as the average vector 301 described above with reference to FIG. 5 is calculated.

Step S202

Next, the tracking target and fork correspondence robot control parameter determination unit 122 executes the following processing in step S202.

The fork center point indicating a center position of the fork and the center direction line passing through the fork center point and extending in the average direction of each route direction (the direction of the average vector) are calculated.

The processing of step S202 will also be described with reference to FIG. 14.

The fork center point 302 and the center direction line 303 are also independent of the viewing angle of the robot 10 similarly to the average vector 301, and the fork center point 302 and the center direction line 303 described above with reference to FIG. 5 are calculated.

Step S203

The processing of steps S203 and S204 and the processing of step S205 can be executed in parallel.

First, the processing of step S203 will be described.

In step S203, the tracking target and fork correspondence robot control parameter determination unit 122 executes the following processing.

The point (fork observation point) on the center direction line 303 in which the fork can be observed within the viewing angle of the robot (for example, within the angle of view of the camera-captured image of the robot) is calculated. The fork observation point includes the actual corner correspondence fork observation point and the pseudo corner correspondence fork observation point.

This processing will be described with reference to FIG. 15.

The positions of the actual corner correspondence fork observation point and the pseudo corner correspondence fork observation point calculated in step S203 differ according to the viewing angle of the robot.

Figure 15:
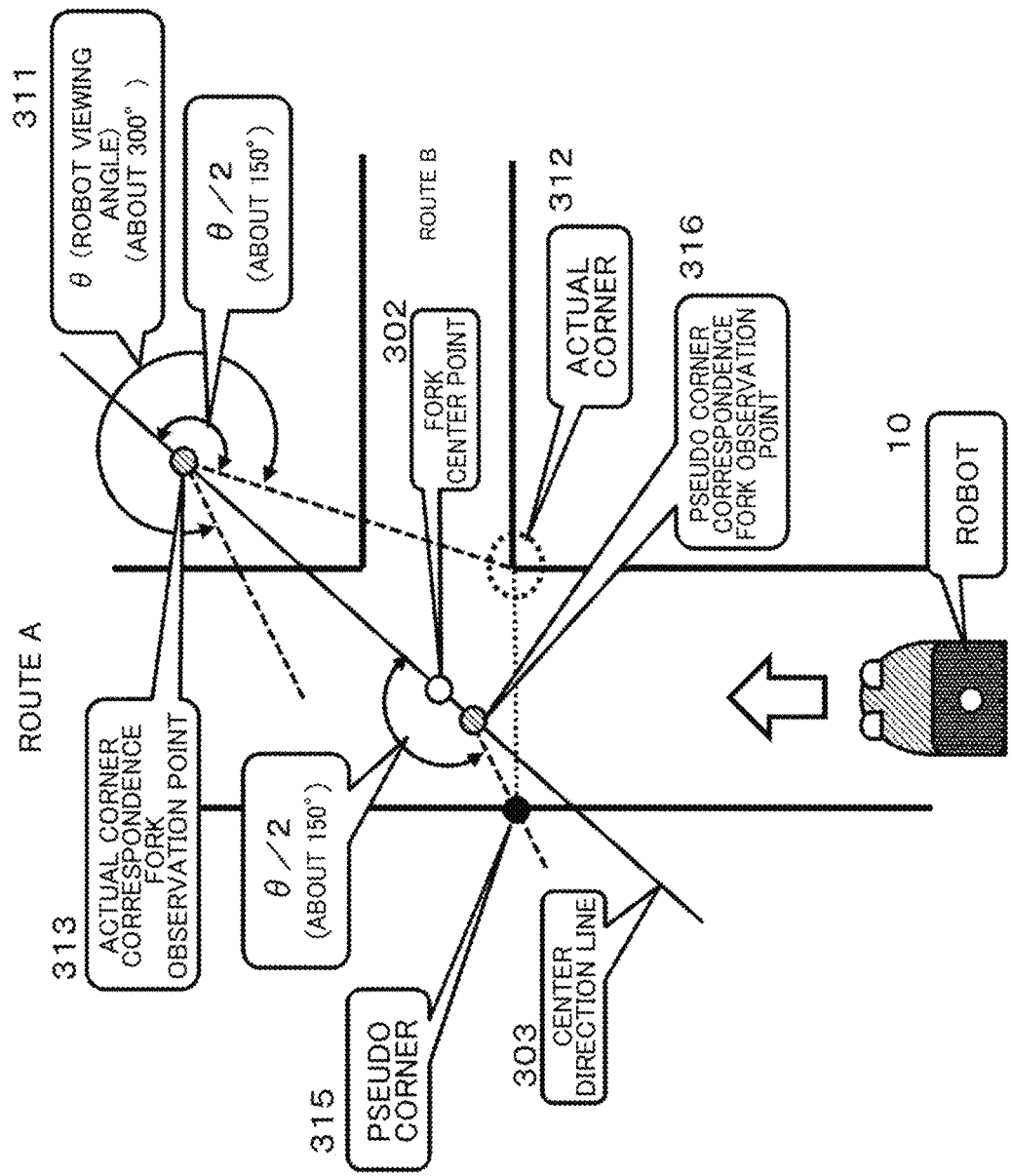
FIG. 15 is a diagram illustrating a specific example of processing that is executed by the tracking target and fork correspondence robot control parameter determination unit.

FIG. 15 illustrates positions of the actual corner correspondence fork observation point 313 and the pseudo corner correspondence fork observation point 316 when a viewing angle (θ) of the robot 10 is θ≈300°.

These positions differ from positions of the actual corner correspondence fork observation point 313 and the pseudo corner correspondence fork observation point 316 when the viewing angle (θ) described above with reference to FIG. 8 is θ≈160°.

As described above, the viewing angle of the robot 10 is an angle that the robot 10 can recognize using the detection data of the camera or sensor. For example, the viewing angle corresponds to an angle of view of a camera-captured image when the robot 10 is configured to perform object recognition using only the camera-captured image.

The example illustrated in FIG. 15 is positions of the actual corner correspondence fork observation point 313 and the pseudo corner correspondence fork observation point 316 when a viewing angle (θ) of the robot 10 is θ≈300°, but the actual corner correspondence fork observation point 313 is set outside routes A and B. This position is a position that the robot 10 cannot reach.

On the other hand, the pseudo corner correspondence fork observation point 316 is set within the route.

The "pseudo corner correspondence fork observation point 316" is an end point on the center direction line 303 that falls within the viewing angle θ of the robot 10. That is, the point is calculated as the farthest point (a point farthest from the current position of the robot 10) on the center direction line 303 at which the robot 10 directed in the direction of the average vector 301 can recognize the "pseudo corner 315".

Thus, in step S203, as the point (fork observation point) on the center direction line 303 in which the fork can be observed within the viewing angle of the robot (for example, within the angle of view of the camera-captured image of the robot), the "actual corner correspondence fork observation point" and the "pseudo corner correspondence fork observation point" are calculated.

Step S204

Next, the tracking target and fork correspondence robot control parameter determination unit 122 executes the following processing in step S204.

The point closest to the current position of the robot 10 (the fork center and in-observation-point closest point) is selected from among the fork center point 302 and fork observation points (the actual corner correspondence fork observation point 313 and the pseudo corner correspondence fork observation point 316).

That is,
(a) the fork center point 302 calculated in step S202, and
(b) the fork observation points (the actual corner correspondence fork observation point 313 and the pseudo corner correspondence fork observation point 316) calculated in step S203 the point closest to the current position of the robot 10 is selected from these points as the "fork center and in-observation-point closest point".

Figure 16:
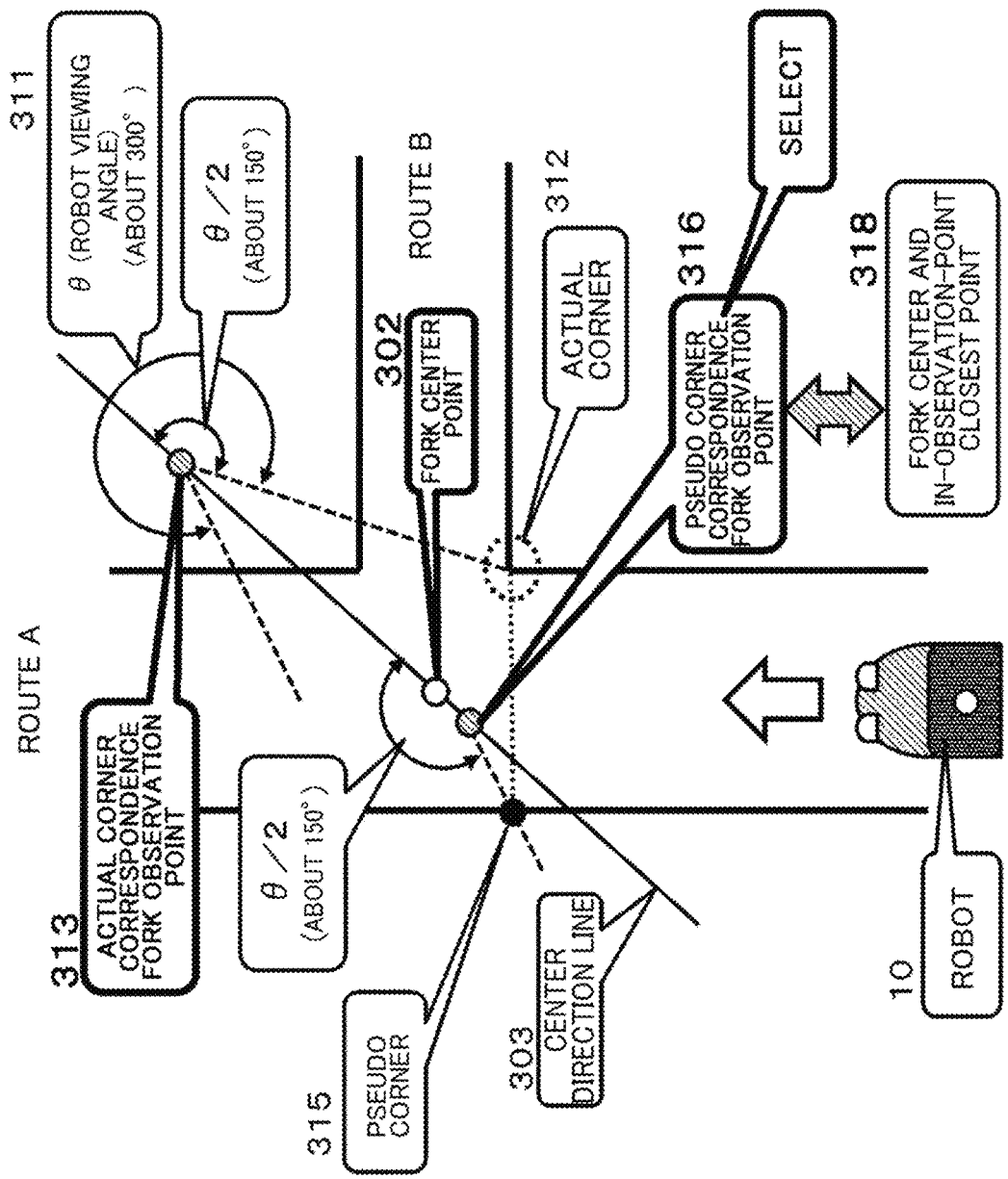
FIG. 16 is a diagram illustrating a specific example of processing that is executed by the tracking target and fork correspondence robot control parameter determination unit.

The processing of step S204 will be described with reference to FIG. 16. FIG. 16 illustrates three points including the fork center point 302 calculated in step S202, the actual corner correspondence fork observation point 313 which is the fork observation point calculated in step S203, and the pseudo corner correspondence fork observation point 316.

In step S204, the point closest to the current position of the robot 10 is selected from among these three points as the "fork center and in-observation-point closest point".

In the example illustrated in FIG. 16, the point closest to the current position of the robot 10 among the fork center point 302, the actual corner correspondence fork observation point 313, and the pseudo corner correspondence fork observation point 316 is the pseudo corner correspondence fork observation point 316. Therefore, in the example illustrated in FIG. 16, the pseudo corner correspondence fork observation point 316 is selected as a "fork center and in-observation-point closest point 318".

Step S205

Next, the processing of step S205 of the flow illustrated in FIG. 4 will be described.

As described above, the processing of step S205 can be executed in parallel with the processing of steps S203 and S204 described above.

The tracking target and fork correspondence robot control parameter determination unit 122 executes the following processing in step S205.

A point on the center direction line that does not contact the obstacle such as a wall, which is a point closest to the current position of the robot (on-center-direction-line non-contact closest point) is calculated.

The processing of step S205 will be described with reference to FIG. 17.

Figure 17:
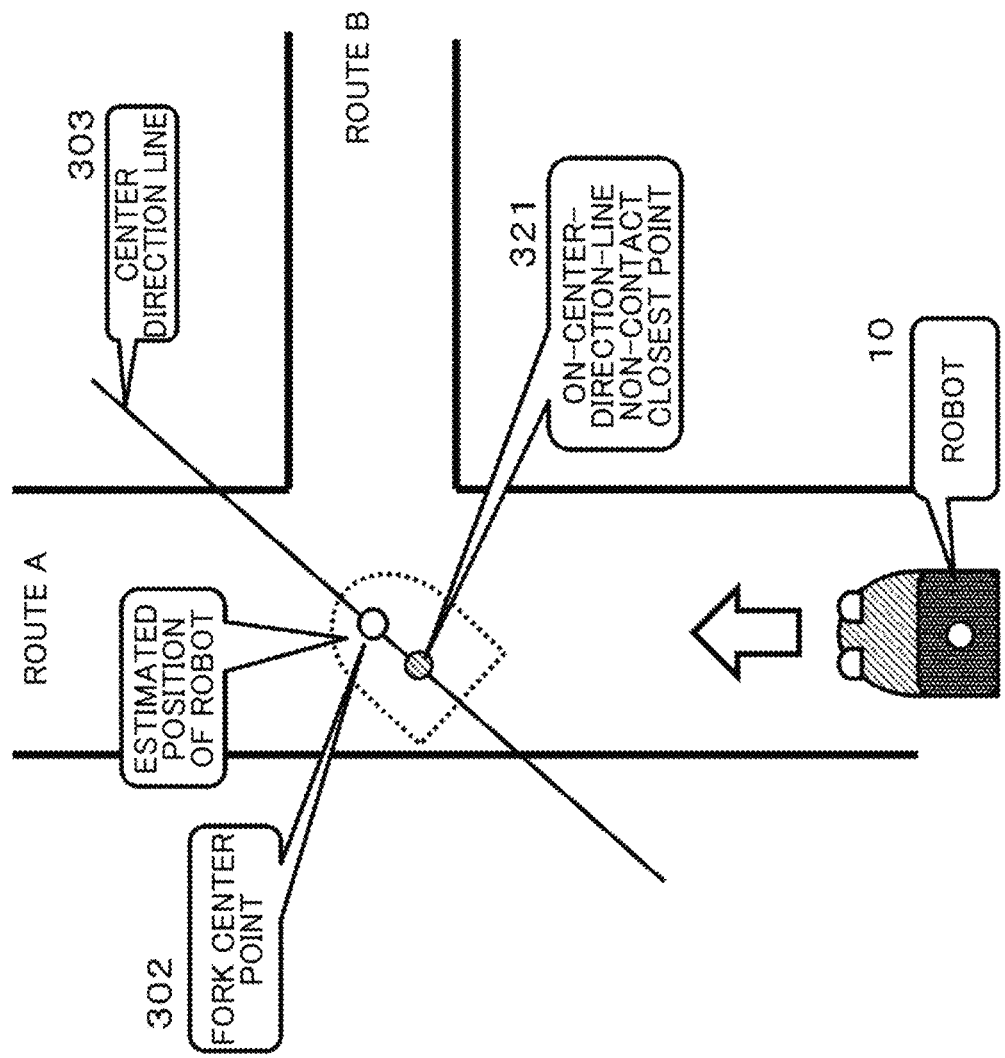
FIG. 17 is a diagram illustrating a specific example of processing that is executed by the tracking target and fork correspondence robot control parameter determination unit.

In FIG. 17, a position at which the robot does not come into contact with an "obstacle such as a wall" in a posture with the direction of the average vector 301 as a forward direction on the center direction line 303, which is closest to the current position of the robot, is indicated as an "estimated robot position" by a dashed line.

In step S205, the "estimated robot position" indicated by the dashed line in FIG. 17 is calculated. That is, the position at which the robot does not come into contact with the "obstacle such as a wall" in the posture with the direction of the average vector 301 as the forward direction on the center direction line 303 is calculated as the on-center-direction-line non-contact closest point 321.

The processing of step S205 is the same as the processing described above with reference to FIG. 10 because the processing of step S205 is irrelevant to the viewing angle of the robot 10.

Step S206

Next, the processing of step S206 in the flow illustrated in FIG. 4 will be described.

The processing of step S206 is executed after the processing of steps S203 and S204 and the processing of step S205 described above are completed.

The tracking target and fork correspondence robot control parameter determination unit 122 executes the following processing in step S206.

The point farthest from the current position of the robot is selected from the fork center and in-observation-point closest point and the on-center-direction-line non-contact closest point, and the selected point is set as the goal position.

That is, the point farthest from the current position of the robot 10 is selected from two points:
(a) the fork center and in-observation-point closest point 318 calculated in step S204, and
(b) the on-center-direction-line non-contact closest point 321 calculated in step S205,
and the selected point is set as the goal position.

This processing will be described with reference to FIG. 18.

Figure 18:
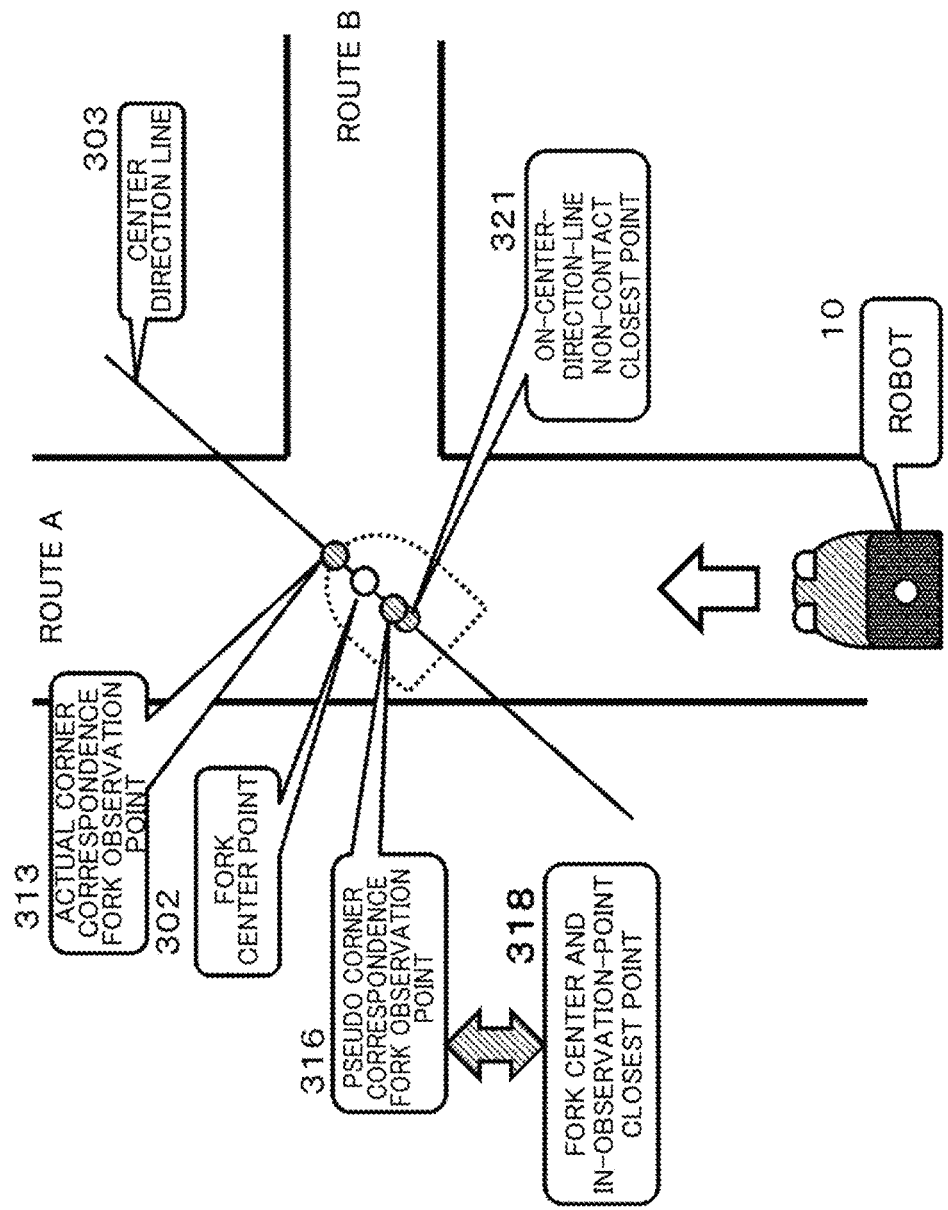
FIG. 18 is a diagram illustrating a specific example of processing that is executed by the tracking target and fork correspondence robot control parameter determination unit.

In FIG. 18, two points:
(a) the fork center and in-observation-point closest point 318 calculated in step S204, and
(b) the on-center-direction-line non-contact closest point 321 calculated in step S205
are shown.

In step S206, the point farthest from the current position of the robot 10 is selected from the two points, and the selected point is set as the goal position.

In the example illustrated in FIG. 18, a point farthest from the current position of the robot 10 between the fork center and in-observation-point closest point 318 and the on-center-direction-line non-contact closest point 321 is the on-center-direction-line non-contact closest point 321, and this on-center-direction-line non-contact closest point 321 is selected as the "goal position".

Step S207

Next, the processing of step S207, which is the last step of the flow illustrated in FIG. 4, will be described.

The tracking target and fork correspondence robot control parameter determination unit 122 executes the following processing in step S207.

Robot control parameters (goal position, goal posture, and goal route) with "goal position=selected point" and "goal posture=average vector direction" are generated.

A specific example of the processing of step S207 will be described with reference to FIGS. 19 and 20.

Figure 19:
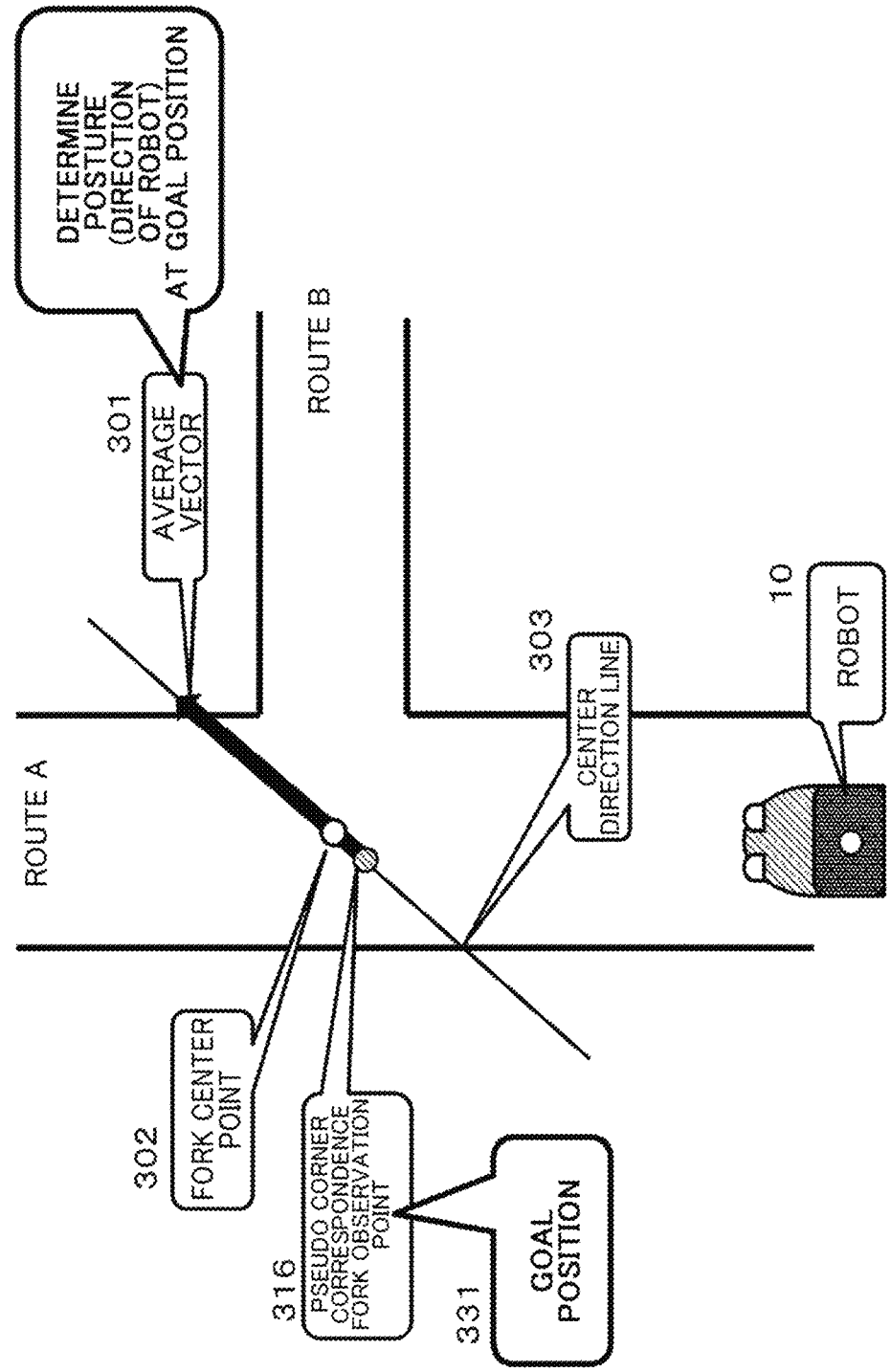
FIG. 19 is a diagram illustrating a specific example of processing that is executed by the tracking target and fork correspondence robot control parameter determination unit.

FIG. 19 illustrates the goal position 331 determined in step S206.

In step S207, first, the goal posture is determined in the direction of the average vector 301 calculated in step S201.

In step S207, the goal route is determined on the basis of the goal position and goal posture.

Figure 20:
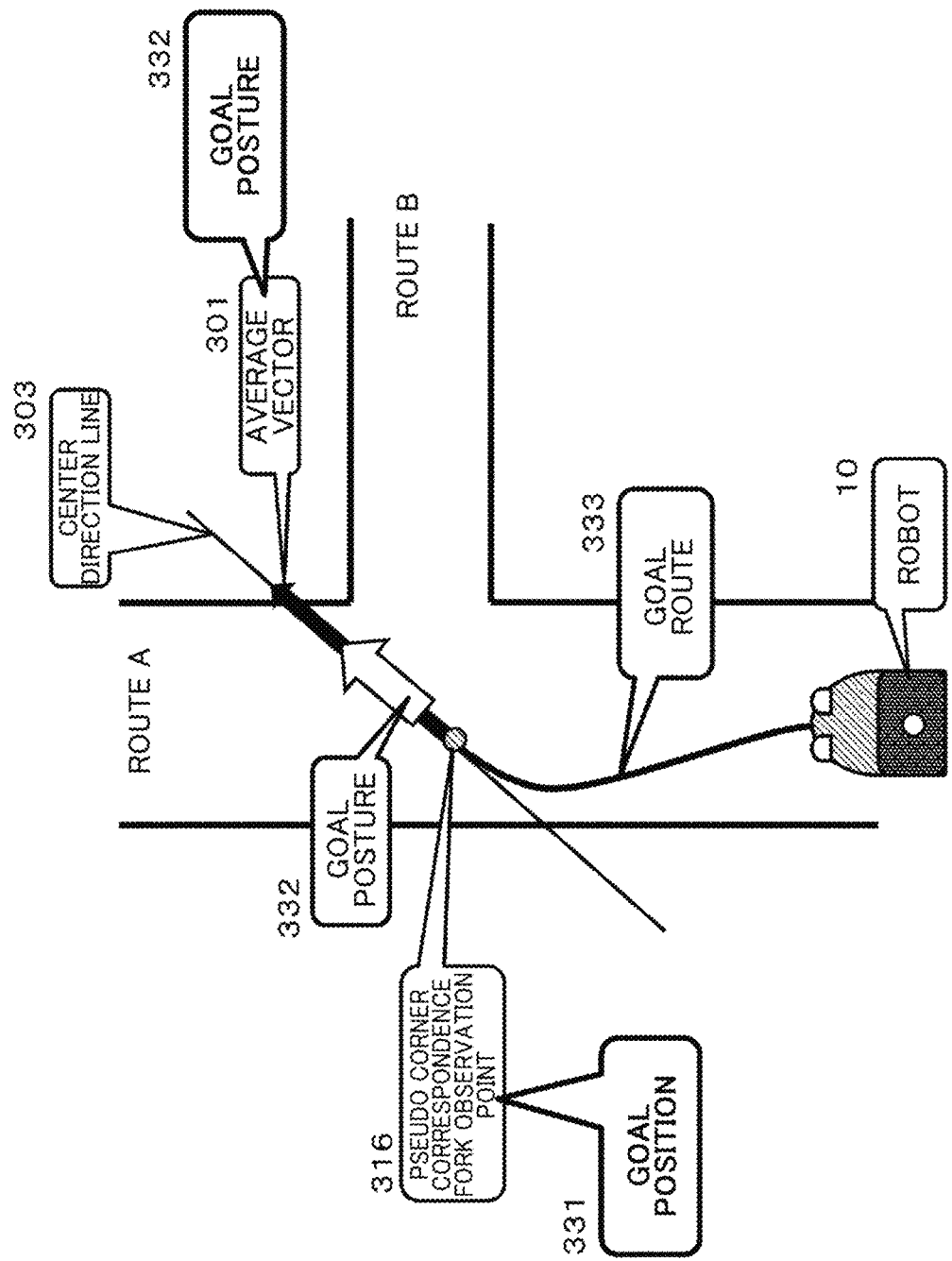
FIG. 20 is a diagram illustrating a specific example of processing that is executed by the tracking target and fork correspondence robot control parameter determination unit.

FIG. 20 illustrates the goal position 331, goal posture 332, and goal route 333 determined in step S207.

As illustrated in FIG. 20, the goal position 331 is the point selected in step S206, that is, a selected point selected from the fork center and in-observation-point closest point 318 and the on-center-direction-line non-contact closest point 321. The goal posture 332 is the direction of the average vector 301 calculated in step S201.

The goal route 333 is a route for setting "goal posture 332=average vector direction" at the "goal position 331", and route generation in which a scheme such as "Hybrid A Star (Hybrid A*)" or Dynamic Window Approach (DWA) that is an existing route generation algorithm, or machine learning data has been applied is possible, as described above.

The processing described above with reference to FIGS. 14 to 20 is a specific example of processing when the robot viewing angle (θ) is a wide viewing angle of θ≈300°.

Thus, the processing of the present disclosure can be processing corresponding to various robot viewing angles.

In either case, the robot 10 can reduce a possibility that the tracking target 20 will deviate from the viewing angle of the robot 10, bring the tracking target 20 within the viewing angle of the robot 10, and reliably track the tracking target 20 even in a state in which one of the routes constituting the fork which the tracking target 20 selects and moves along at the fork cannot be estimated.

6. Example of Processing According to Various Fork Configurations or Robot Viewing Angles Next, an example of processing according to various fork configurations or robot viewing angles will be described.

The above embodiment is an example of processing when the fork includes orthogonal routes A and B and the robot viewing angle (θ) is θ=160° and θ≈300°.

However, actually, there are various configurations of the fork, and various settings are assumed for the robot viewing angle (θ).

Hereinafter, a processing example according to a variation in fork configuration or robot viewing angle will be described.

Figure 21:
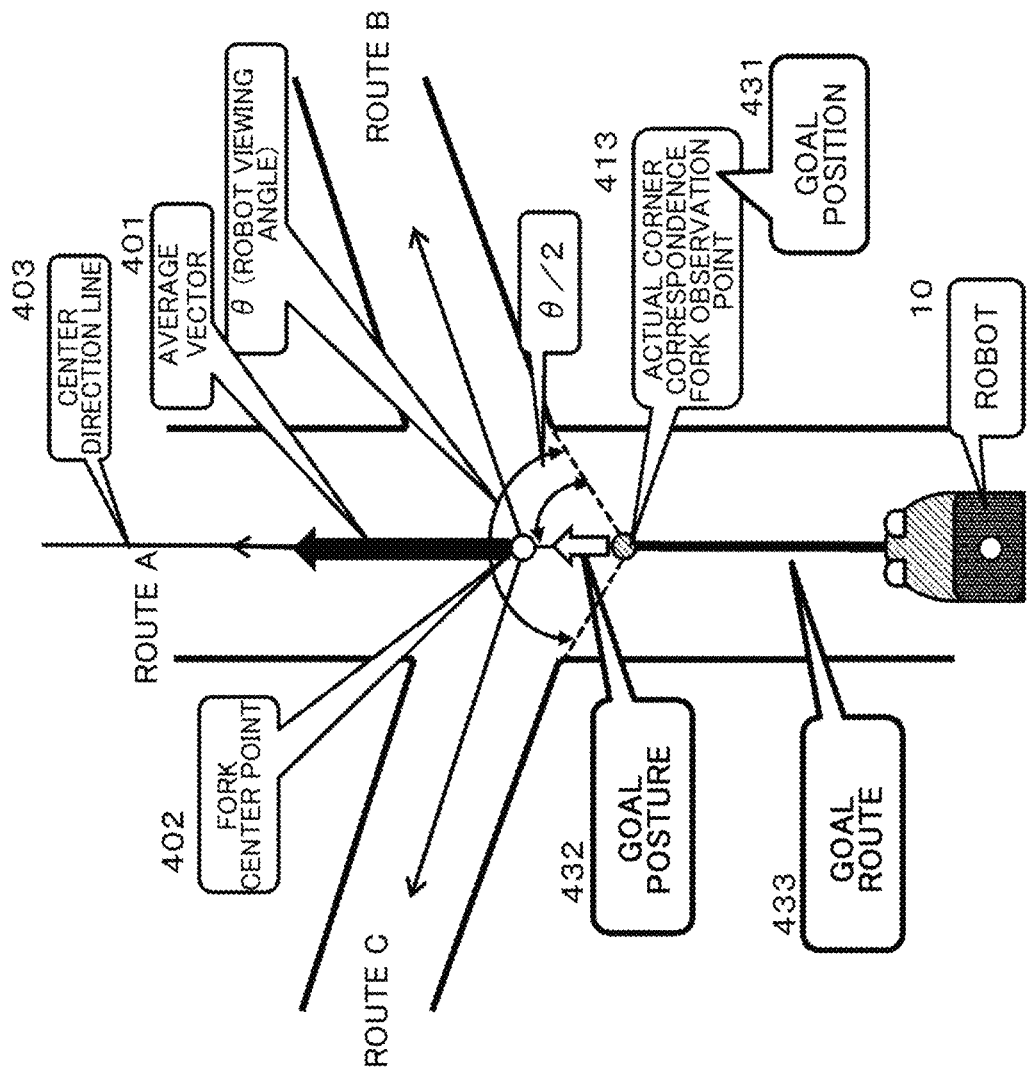
FIG. 21 is a diagram illustrating a specific example of processing that is executed by the tracking target and fork correspondence robot control parameter determination unit.

FIG. 21 is a diagram illustrating an example of a fork including three routes A, B, and C.

Further, the example is an example in which the viewing angle (θ) of the robot 10 is about θ≈120°.

Each position or route illustrated in FIG. 21 is set by executing the processing according to the previously described flow illustrated in FIG. 4 in setting the fork configuration and the robot viewing angle (θ).

An average vector 401 is a vector having an average direction of routes A, B, and C as a vector direction, and is a vector matching a direction of route A in the example illustrated in the figure.

A fork center point 402 is set at an intersection among center lines of routes A, B, and C.

A center direction line 403 is set as a straight line passing through the fork center point 402 and extending in a direction of the average vector 401.

In step S203 of the flow illustrated in FIG. 4, the actual corner correspondence fork observation point and the pseudo corner correspondence fork observation point are calculated.

Further, in step S204, a pseudo corner correspondence fork observation point 413 illustrated in FIG. 21 is selected as the point closest to the current position of the robot 10.

In the configuration illustrated in FIG. 21, because the center direction line 403 is a straight line that passes through a center position of route A, the robot 10 does not come into contact with an obstacle such as a wall at any position on the center direction line 403. Therefore, the on-center-direction-line non-contact closest point calculated in step S205 of the flow illustrated in FIG. 4 is calculated as a position corresponding to a current robot position.

In step S206, the "pseudo corner correspondence fork observation point 413" selected in steps S203 and S204 is selected as the goal position 431.

Further, the direction of the average vector 401 set in step S201 is set as the goal posture 432.

Further, a goal route 433 for being set in the goal posture 432 at the goal position 431 is generated by applying an existing algorithm.

It becomes possible to track the tracking target while bringing the tracking target within the robot viewing angle without losing sight of the tracking target by driving the robot 10 according to the robot control parameters (goal position, goal posture, and goal route) generated by these processing.

Figure 22:
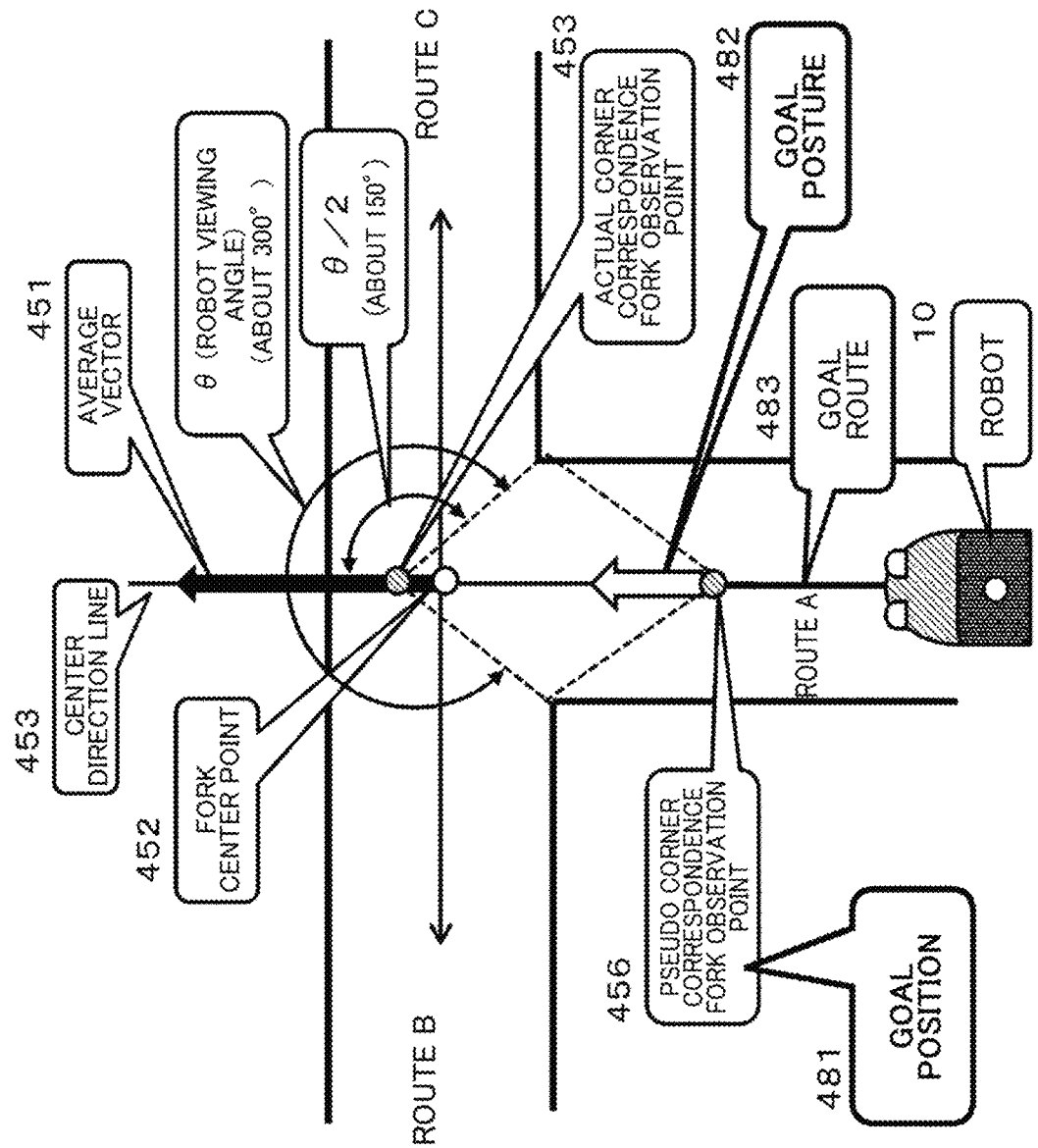
FIG. 22 is a diagram illustrating a specific example of processing that is executed by the tracking target and fork correspondence robot control parameter determination unit.

An example illustrated in FIG. 22 shows a configuration in which the fork is a T-junction. That is, the example shows a configuration of the T-junction in which route A along which the robot travels hits, and routes B and C exist in a perpendicular direction.

Further, the example is an example in which the viewing angle (θ) of the robot 10 is θ≈300°.

Each position or route illustrated in FIG. 22 is set by executing the processing according to the previously described flow illustrated in FIG. 4 in setting the fork configuration and the robot viewing angle (θ).

An average vector 451 is a vector having an average direction of routes B and C as a vector direction, and is a vector matching a direction of route A in the example illustrated in the figure.

A fork center point 452 is set at an intersection among center lines of routes A, B, and C.

A center direction line 453 is set as a straight line passing through the fork center point 452 and extending in a direction of the average vector 451.

In step S203 of the flow illustrated in FIG. 4, an actual corner correspondence fork observation point 453 and a pseudo corner correspondence fork observation point 456 are calculated.

Further, in step S204, the pseudo corner correspondence fork observation point 456 illustrated in FIG. 22 is selected as the point closest to the current position of the robot 10.

Also in the configuration illustrated in FIG. 22, the on-center-direction-line non-contact closest point calculated in step S205 of the flow illustrated in FIG. 4 is calculated as the position corresponding to the current robot position.

In step S206, the "pseudo corner correspondence fork observation point 456" selected in steps S203 and S204 is selected as the goal position 481.

Further, a direction of the average vector 451 set in step S201 is set as the goal posture 482.

Further, a goal route 483 for being set in the goal posture 482 at the goal position 481 is generated by applying an existing algorithm.

It becomes possible to track the tracking target while bringing the tracking target within the robot viewing angle without losing sight of the tracking target by driving the robot 10 according to the robot control parameters (goal position, goal posture, and goal route) generated by these processing.

7. Configuration Examples of Mobile Device and Information Processing Device of Present Disclosure Next, configuration examples of the mobile device and the information processing device of the present disclosure will be described.

The mobile device of the present disclosure includes not only the robot 10 described in the above-described embodiment, but also various mobile devices such as an automated driving vehicle or a drone.

Further, the data processing unit of the information processing device included inside the mobile device such as the robot 10 may perform calculation of the robot control parameters (goal position, goal posture, and goal route) or the control of the mobile device (robot or the like), or an external information processing device capable of communicating with the robot may perform the calculation of the robot control parameters (goal position, goal posture, and goal route) or the control of the mobile device (robot or the like).

Figure 23:
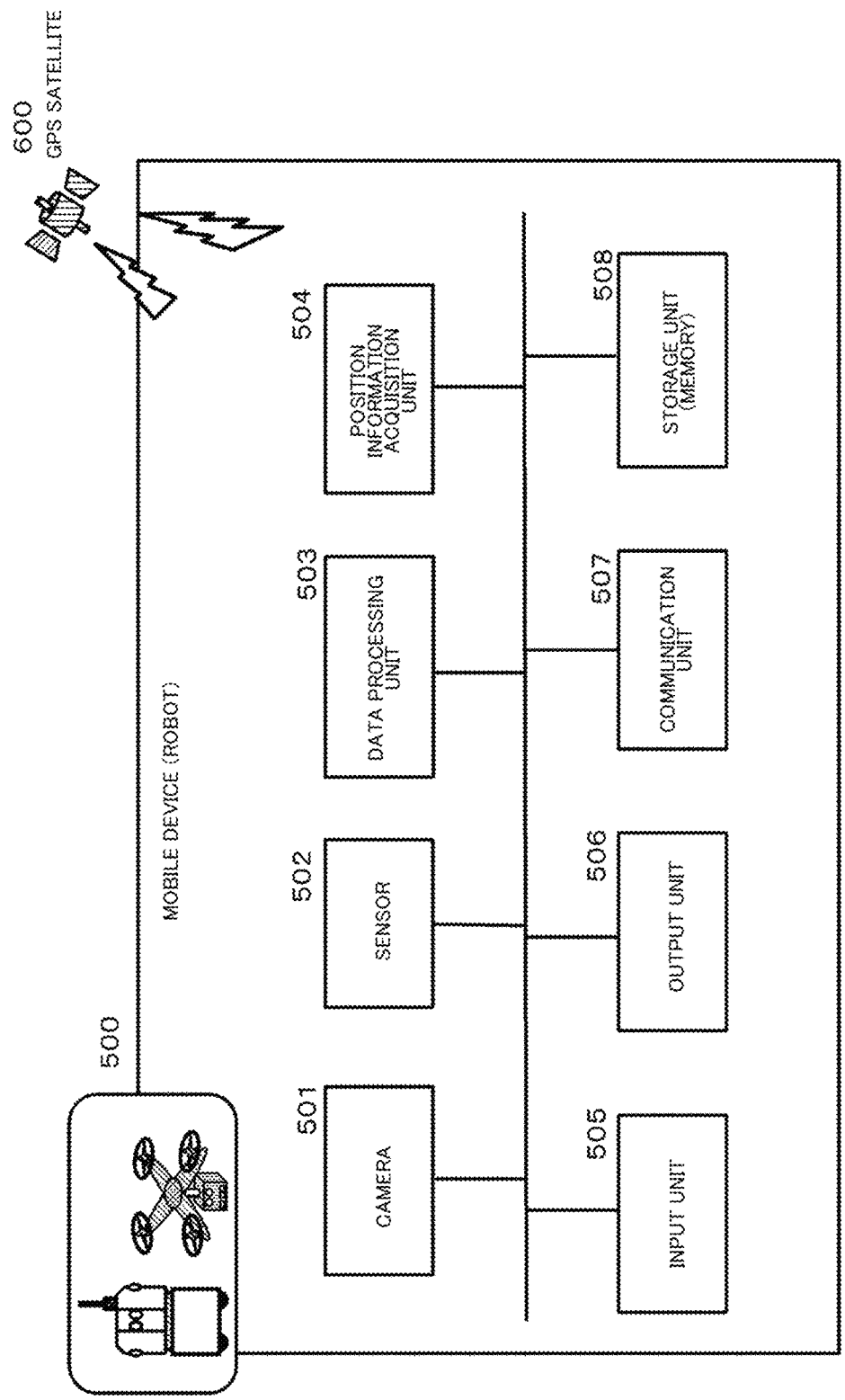
FIG. 23 is a diagram illustrating a configuration example of a mobile device when a mobile device alone performs calculation of robot control parameters (goal position, goal posture, and goal route) or mobile device control.

FIG. 23 is a diagram illustrating a configuration example of a mobile device 500 when the mobile device such as the robot 10 alone performs calculation of the robot control parameters (goal position, goal posture, and goal route) or mobile device control. That is, FIG. 23 is a diagram illustrating a configuration example of the mobile device 500 when an information processing device included inside the mobile device performs the calculation of the robot control parameters (goal position, goal posture, and goal route) or the mobile device control.

Figure 24:
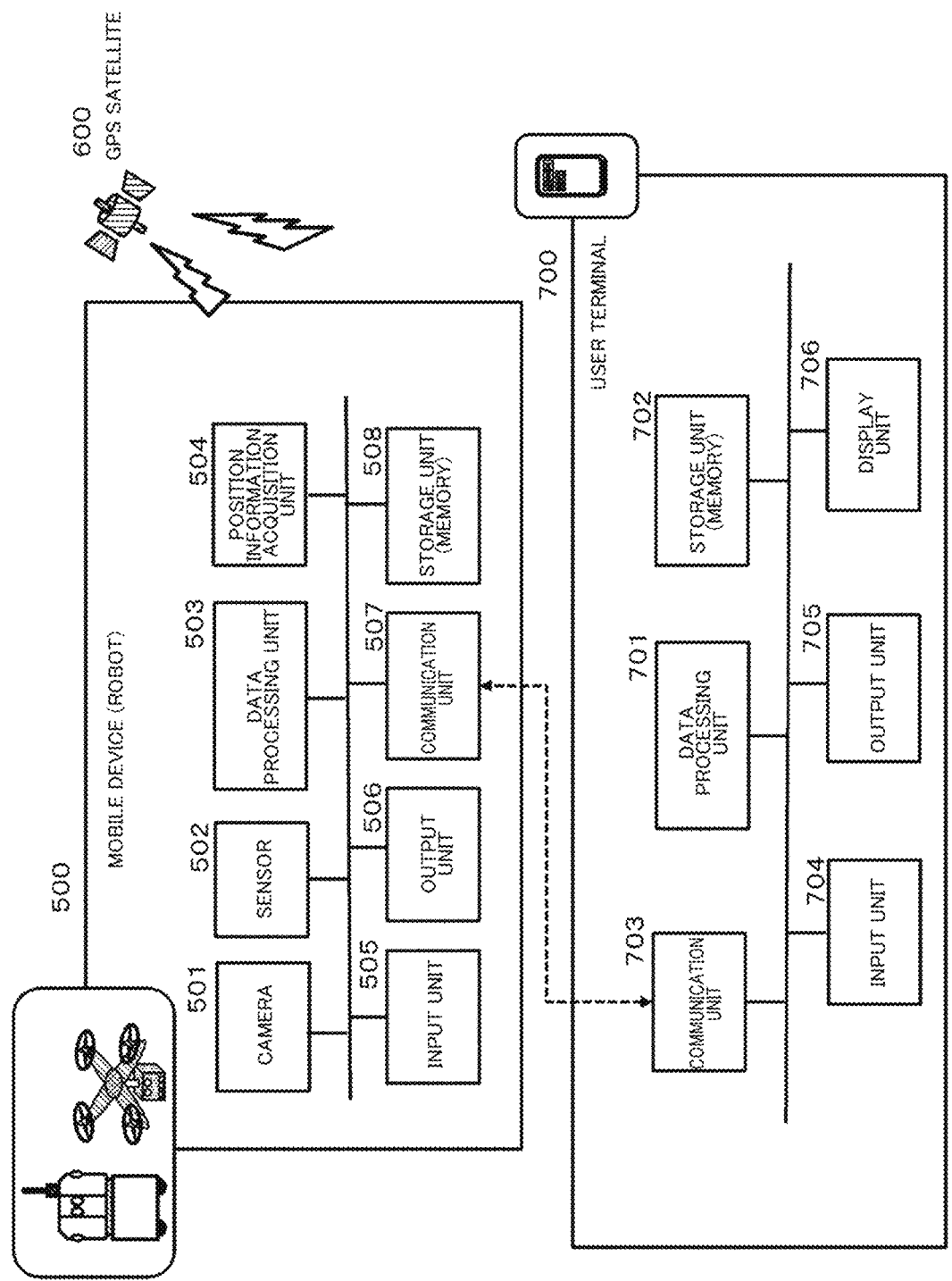
FIG. 24 is a diagram illustrating a configuration example of a mobile device and a user terminal when the user terminal that can communicate with the mobile device performs calculation of robot control parameters (goal position, goal posture, and goal route) or mobile device control.

FIG. 24 is a diagram illustrating a configuration example of the mobile device 500 and a user terminal 700 when a user terminal capable of communicating with a mobile device, such as a controller, a PC, or a smartphone performs calculation of the robot control parameters (goal position, goal posture, and goal route) and mobile device control.

First, the configuration example of the mobile device 500 when the mobile device alone performs calculation of the robot control parameters (goal position, goal posture, and goal route) or mobile device control will be described with reference to FIG. 23.

As illustrated in FIG. 23, mobile device 500 includes a camera 501, a sensor 502, a data processing unit 503, a position information acquisition unit 504, an input unit 505, an output unit 506, a communication unit 507, and a storage unit (memory) 508.

The camera 501 captures an image in a traveling direction of the mobile device 500 or an image of the tracking target.

The sensor 502 is, for example, an object detection sensor configured of, for example, Light Detection and Ranging or Laser Imaging Detection and Ranging (LiDAR). A distance to an obstacle, and the like are measured. The sensor 502 is not limited to the LiDAR, and may be, for example, a stereo camera, a ToF sensor, an ultrasonic sensor, a radar, or a sonar.

The data processing unit 503 executes the processing according to the above-described embodiment, that is, calculation of robot control parameters (goal position, goal posture, and goal route), mobile device control processing, or the like.

The robot control parameter determination unit 120, the robot drive information generation unit 131, and the like, which are main components of the mobile device (robot) 100 described above with reference to FIG. 2 are included in the data processing unit 503.

The data processing unit 503 includes a processor such as a CPU having a program execution function, for example, and executes processing according to the flowcharts described in the above embodiment, and the like.

The program is stored in a storage unit 508.

The position information acquisition unit 504 executes, for example, communication with a GPS satellite 600, analyzes a current position (latitude, longitude, and height) of the mobile device 500 on the basis of information on communication with the GPS satellite 600, and outputs analysis information to the data processing unit 503.

The input unit 505 is, for example, an operation unit that is operated by a user, and is used for various processing, such as processing for inputting a user request such as starting and stopping of traveling.

The output unit 506 includes an audio output unit, an image output unit, and the like.

The communication unit 507 executes communication with a user terminal or an external server.

The storage unit (memory) 508 is used as a storage area for programs that are executed by the data processing unit 503, and a work area. The storage unit (memory) 508 is also used as a storage area for various parameters applied to processing. A storage unit (memory) 106 includes a RAM, a ROM, and the like.

Next, a configuration of the mobile device 500 and the user terminal 700 when the user terminal capable of communicating with a mobile device, such as a controller, a PC, or a smartphone performs the calculation of the robot control parameters (goal position, goal posture, and goal route) and the mobile device control will be described with reference to FIG. 24.

The mobile device 500 has the same configuration as the configuration described with reference to FIG. 23.

The mobile device 500 performs communication with the user terminal 700 via the communication unit 507.

A configuration of the user terminal 700 will be described. As illustrated in the figure, the user terminal 700 includes a data processing unit 701, a storage unit (memory) 702, a communication unit 703, an input unit 704, an output unit 705, and a display unit 706.

The data processing 701 executes calculation of the robot control parameters (goal position, goal posture, and goal route) of the mobile device 500, mobile device control processing, or the like.

Processing executed by the robot control parameter determination unit 120, the robot drive information generation unit 131, and the like, which are main components of the mobile device (robot) 100 described above with reference to FIG. 4, is executed in the data processing unit 701.

The data processing unit 701 of the user terminal 700 performs calculation of the robot control parameters (goal position, goal posture, and goal route), generates mobile device control information on the basis of a result of the calculation, and transmits the mobile device control information to the mobile device 500 via the communication unit 703.

The mobile device 500 moves according to control information received from the user terminal 700.

The data processing unit 701 includes, for example, a processor such as a CPU having a program execution function, and executes processing according to the flowcharts described in the above-described embodiment.

The program is stored in the storage unit 702.

A storage unit (memory) 702 is used as a storage area for programs executed by the data processing unit 701 and a work area. The storage unit (memory) 702 is also used as a storage area for various parameters applied to processing. A storage unit (memory) 204 includes a RAM, a ROM, and the like.

The communication unit 703 executes communication with the mobile device 500 or an external server.

The input unit 704 is an operation unit that is operated by the user, and is used for various processing, such as processing of inputting a user request such as starting and ending of control of the mobile device 500.

The output unit 705 includes an audio output unit, an image output unit, and the like.

The display unit 706 is used for a display of a camera-captured image of the mobile device 500, or the like, a display of a map stored in the storage unit 702, and a display of route information generated by the data processing unit 701, or the like.

8. Conclusion of Configuration of Present Disclosure

The embodiments of the present disclosure have been described in detail above with reference to specific embodiments. However, it is obvious that those skilled in the art can modify or substitute the embodiments without departing from the gist of the present disclosure. That is, the present invention has been disclosed in the form of examples and should not be construed as limiting. In order to determine the gist of the present disclosure, the claims should be considered.

The technology disclosed in the present specification can be configured as follows.

(1) An information processing device including:
a control parameter determination unit configured to determine control parameters used for a mobile device to track a tracking target,
wherein the control parameter determination unit calculates a goal position for bringing the tracking target within a viewing angle of the mobile device and a goal posture at the goal position, and generates a control parameter including the calculated goal position and goal posture when one of a plurality of routes constituting a fork which the tracking target selects and moves along cannot be discriminated.

(2) The information processing device according to (1), wherein the control parameter determination unit calculates a goal position at which the tracking target can be within the viewing angle of the mobile device, and a goal posture at the goal position even when the tracking target selects and moves along the one of the plurality of routes constituting the fork.

(3) The information processing device according to (1) or (2), wherein the control parameter determination unit calculates a goal route for being set in the goal posture at the goal position on the basis of the calculated goal position and goal posture.

(4) The information processing device according to any one of (1) to (3), wherein the control parameter determination unit calculates an average vector indicating an average direction of each route direction of the plurality of routes constituting the fork,
and sets a direction of the calculated average vector as the goal posture.

(5) The information processing device according to (4), wherein the control parameter determination unit
calculates an intersection between center lines of the plurality of routes constituting the fork as a fork center point,
calculates a line passing through the calculated fork center point and being parallel to the average vector as a center direction line, and
calculates a position on the calculated center direction line as the goal position.

(6) The information processing device according to (5), wherein the control parameter determination unit calculates, as a candidate for the goal position, an end point which is located on the center direction line and at which an actual corner, the actual corner being an actual corner area constituting the fork, is within the viewing angle of the mobile device, as an actual corner correspondence fork observation point.

(7) The information processing device according to (6), wherein the control parameter determination unit calculates an end point at which the actual corner falls within the viewing angle of the mobile device as the actual corner correspondence fork observation point when the mobile device is located on the center direction line, and the mobile device is directed in a direction of the average vector.

(8) The information processing device according to (7), wherein the control parameter determination unit acquires viewing angle data of the mobile device in advance, and calculates the actual corner correspondence fork observation point on the basis of the acquired viewing angle data.

(9) The information processing device according to (8), wherein the control parameter determination unit calculates, as a candidate for the goal position, an end point which is located on the center direction line and at which a pseudo corner, the pseudo corner being an intersection between an auxiliary line extending from the actual corner and a route end surface, is within the viewing angle of the mobile device, as a pseudo corner correspondence fork observation point.

(10) The information processing device according to (9), wherein the control parameter determination unit selects a point closest to a current position of the mobile device from between the actual corner correspondence fork observation point and the pseudo corner correspondence fork observation point, as a fork center and in-observation-point closest point.

(11) The information processing device according to (10), wherein the control parameter determination unit calculates a point located on the center direction line and not in contact with an obstacle, the point being a point closest to the current position of the mobile device, as an on-center-direction-line non-contact closest point.

(12) The information processing device according to (11), wherein the control parameter determination unit calculates a point farthest from the current position of the mobile device as the goal position from two points including the fork center and in-observation-point closest point and the on-center-direction-line non-contact closest point.

(13) The information processing device according to any one of (1) to (12), wherein the information processing device is provided in the mobile device.

(14) The information processing device according to any one of (1) to (12), wherein the information processing device is capable of communicating with the mobile device.

(15) An information processing system including a mobile device, and an information processing device capable of communicating with the mobile device,
wherein the information processing device includes
a control parameter determination unit configured to determine control parameters used for a mobile device to track a tracking target,
the control parameter determination unit calculates a goal position for bringing the tracking target within a viewing angle of the mobile device and a goal posture at the goal position, and generates a control parameter including the calculated goal position and goal posture when one of a plurality of routes constituting a fork which the tracking target selects and moves along cannot be discriminated, and
the mobile device moves according to control parameters including the goal position and the goal posture generated by the information processing device.

(16) An information processing method executed in an information processing device,
wherein the information processing device includes
a control parameter determination unit configured to determine control parameters used for a mobile device to track a tracking target, and
the control parameter determination unit calculates a goal position for bringing the tracking target within a viewing angle of the mobile device and a goal posture at the goal position, and generates a control parameter including the calculated goal position and goal posture when one of a plurality of routes constituting a fork which the tracking target selects and moves along cannot be discriminated.

(17) An information processing method executed in an information processing system including a mobile device, and an information processing device capable of communicating with the mobile device,
wherein the information processing device includes
a control parameter determination unit configured to determine control parameters used for a mobile device to track a tracking target,
the control parameter determination unit calculates a goal position for bringing the tracking target within a viewing angle of the mobile device and a goal posture at the goal position, and generates a control parameter including the calculated goal position and goal posture when one of a plurality of routes constituting a fork which the tracking target selects and moves along cannot be discriminated, and
the mobile device moves according to control parameters including the goal position and the goal posture generated by the information processing device.

(18) A program for causing information processing to be executed in an information processing device,
wherein the information processing device includes
a control parameter determination unit configured to determine control parameters used for a mobile device to track a tracking target, and
the program causes the control parameter determination unit to calculate a goal position for bringing the tracking target within a viewing angle of the mobile device and a goal posture at the goal position, and generate a control parameter including the calculated goal position and goal posture when one of a plurality of routes constituting a fork which the tracking target selects and moves along cannot be discriminated.

Further, a series of processing described in the specification can be executed by hardware, software, or a composite configuration of both. When processing is executed by software, a program in which a processing sequence is recorded can be installed in a memory of a computer built into dedicated hardware and executed, or the program can be installed and executed in a general-purpose computer capable of executing various processing. For example, the program can be recorded on a recording medium in advance. In addition to being installed in a computer from a recording medium, the program can be received via a network such as a local area network (LAN) or the Internet and installed in a recording medium such as an embedded hard disk.

Various processing described in the specification may not only be executed in chronological order according to the description, but may also be executed in parallel or individually according to processing capability of a device that executes the processing or as necessary. Further, in this specification, the system is a logical collective configuration of a plurality of devices, and the devices of the respective configuration are not limited to being in the same case.

INDUSTRIAL APPLICABILITY

As described above, according to the configuration of the embodiment of the present disclosure, the device and the method that prevent the tracking target tracked by the mobile device from deviating from the field of view at the fork, thereby enabling reliable tracking are realized.

Specifically, for example, when the control parameter determination unit of the mobile device cannot discriminate one of a plurality of routes constituting a fork that the tracking target selects and moves along, the control parameter determination unit calculates a goal position for bringing the tracking target within the viewing angle of the mobile device and a goal posture at the goal position, and generates a control parameter including the calculated goal position and goal posture. The control parameter determination unit calculates a position and posture that enable the tracking target to be within the viewing angle of the mobile device regardless of a route that the tracking target selects and moves along.

With this configuration, the device and the method that prevent the tracking target tracked by the mobile device from deviating from the field of view at the fork, thereby enabling reliable tracking are realized.

REFERENCE SIGNS LIST

10 Robot
20 Tracking target
100 Mobile device (robot)
110 Environment recognition unit
111 Fork detection unit
112 Tracking target detection unit
120 Robot control parameter determination unit
121 Robot control parameter determination algorithm switching unit
122 Tracking target and fork correspondence robot control parameter determination unit
123 Tracking target correspondence robot control parameter determination unit
131 Robot drive information generation unit
132 Robot drive unit
500 Mobile device
501 Camera
502 Sensor
503 Data processing unit
504 Position information acquisition unit
505 Input unit
506 Output unit
507 Communication unit
508 Storage unit (memory)
600 GPS satellite
700 User terminal
701 Data processing unit
702 Storage unit (memory)
703 Communication unit
704 Input unit
705 Output unit
706 Display unit

The invention claimed is:

1. An information processing device comprising:
control parameter determination circuitry that is configured by execution of computer readable instructions to determine control parameters used for a mobile device to track a tracking target, wherein
when one of a plurality of routes constituting a fork which the tracking target selects and moves along cannot be determined, the control parameter determination circuitry is further configured to
calculate a goal position for bringing the tracking target within a viewing angle of the mobile device and a goal posture at the goal position, by calculating an average vector indicating an average direction of route directions of the plurality of routes constituting the fork and setting a direction of the average vector as the goal posture, and
generate the control parameters including the goal position and the goal posture that are calculated.

2. The information processing device according to claim 1, wherein
the control parameter determination circuitry is further configured to calculate a goal position at which the tracking target can be within the viewing angle of the mobile device and a goal posture at the goal position regardless of a route that the tracking target selects and moves along.

3. The information processing device according to claim 1, wherein
the control parameter determination circuitry is further configured to calculate a goal route for setting the mobile device in the goal posture at the goal position on the basis of the goal position and the goal posture that are calculated.

4. The information processing device according to claim 1, wherein
the control parameter determination circuitry is further configured to
calculate an intersection of center lines of the plurality of routes constituting the fork as a fork center point,
calculate a line passing through the fork center point and being parallel to the average vector as a center direction line, and
calculate a position on the center direction line as the goal position.

5. The information processing device according to claim 4, wherein
the control parameter determination circuitry is further configured to calculate, as a candidate for the goal position, an end point which is located on the center direction line and at which an actual corner is within the viewing angle of the mobile device, as an actual corner correspondence fork observation point, the actual corner being an actual corner area constituting the fork.

6. The information processing device according to claim 5, wherein
the control parameter determination circuitry is further configured to calculate an end point at which the actual corner falls within the viewing angle of the mobile device, as the actual corner correspondence fork observation point, when the mobile device is located on the center direction line and the mobile device is directed in the direction of the average vector.

7. The information processing device according to claim 6, wherein
the control parameter determination circuitry is further configured to acquire viewing angle data of the mobile device in advance, and calculate the actual corner correspondence fork observation point on the basis of the viewing angle data that is acquired.

8. The information processing device according to claim 7, wherein
the control parameter determination circuitry is further configured to calculate, as the candidate for the goal position, an end point which is located on the center direction line and at which a pseudo corner is within the viewing angle of the mobile device, as a pseudo corner correspondence fork observation point, the pseudo corner being an intersection of an auxiliary line extending from the actual corner and a route end surface.

9. The information processing device according to claim 8, wherein
the control parameter determination circuitry is further configured to select a point closest to a current position of the mobile device from among the fork center point, the actual corner correspondence fork observation point, and the pseudo corner correspondence fork observation point, as a fork center and in-observation-point closest point.

10. The information processing device according to claim 9, wherein
the control parameter determination circuitry is further configured to calculate a point that is located on the center direction line, not in contact with an obstacle, and closest to the current position of the mobile device, as an on-center-direction-line non-contact closest point.

11. The information processing device according to claim 10, wherein
the control parameter determination circuitry is further configured to select, as the goal position, one of the fork center and in-observation-point closest point and the on-center-direction-line non-contact closest point that is farther from the current position of the mobile device.

12. The information processing device according to claim 1, wherein the information processing device is provided in the mobile device.

13. The information processing device according to claim 1, wherein the information processing device is capable of communicating with the mobile device.

14. An information processing system comprising:
a mobile device; and
an information processing device capable of communicating with the mobile device, wherein
the information processing device includes
control parameter determination circuitry that is configured by execution of computer readable instructions to determine control parameters used for the mobile device to track a tracking target, wherein
when one of a plurality of routes constituting a fork which the tracking target selects and moves along cannot be determined, the control parameter determination circuitry is further configured to
calculate a goal position for bringing the tracking target within a viewing angle of the mobile device and a goal posture at the goal position, by calculating an average vector indicating an average direction of route directions of the plurality of routes constituting the fork and setting a direction of the average vector as the goal posture, and
generate the control parameters including the goal position and the goal posture that are calculated, and wherein
the mobile device moves according to the control parameters including the goal position and the goal posture generated by the information processing device.

15. An information processing method executed in an information processing device, the method comprising:
determining control parameters used for a mobile device to track a tracking target, wherein
when one of a plurality of routes constituting a fork which the tracking target selects and moves along cannot be determined, the method further comprises
calculating a goal position for bringing the tracking target within a viewing angle of the mobile device and a goal posture at the goal position, by calculating an average vector indicating an average direction of route directions of the plurality of routes constituting the fork and setting a direction of the average vector as the goal posture, and
generating the control parameters including the goal position and the goal posture that are calculated.

16. An information processing method executed in an information processing system that includes a mobile device and an information processing device capable of communicating with the mobile device, the method comprising:
determining control parameters used for the mobile device to track a tracking target, wherein
when one of a plurality of routes constituting a fork which the tracking target selects and moves along cannot be determined, the method further comprises
calculating a goal position for bringing the tracking target within a viewing angle of the mobile device and a goal posture at the goal position, by calculating an average vector indicating an average direction of route directions of the plurality of routes constituting the fork and setting a direction of the average vector as the goal posture, and
generating the control parameters including the goal position and the goal posture that are calculated, and wherein
the mobile device moves according to the control parameters including the goal position and the goal posture generated by the information processing device.

17. A non-transitory computer-readable storage medium storing a program for causing information processing to be executed in an information processing device, wherein
the information processing device includes
control parameter determination circuitry that is configured by execution of the program to determine control parameters used for a mobile device to track a tracking target, wherein
when one of a plurality of routes constituting a fork which the tracking target selects and moves along cannot be determined, the program causes the control parameter determination circuitry to
calculate a goal position for bringing the tracking target within a viewing angle of the mobile device and a goal posture at the goal position, by calculating an average vector indicating an average direction of each route direction of the plurality of routes constituting the fork and setting a direction of the average vector as the goal posture, and
generate the control parameters including the goal position and the goal posture that are calculated.

* * * * *